(12) United States Patent
Iwata et al.

(10) Patent No.: US 9,983,708 B2
(45) Date of Patent: May 29, 2018

(54) TRANSPARENT CONDUCTIVE LAMINATES AND TOUCH PANELS HAVING TRANSPARENT CONDUCTIVE LAMINATES

(71) Applicant: TOPPAN PRINTING CO., LTD., Tokyo (JP)

(72) Inventors: Reiko Iwata, Tokyo (JP); Yutaka Ito, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 137 days.

(21) Appl. No.: 15/267,783

(22) Filed: Sep. 16, 2016

(65) Prior Publication Data

US 2017/0003774 A1    Jan. 5, 2017

Related U.S. Application Data

(63) Continuation of application No. PCT/JP2015/001558, filed on Mar. 19, 2015.

(30) Foreign Application Priority Data

Mar. 25, 2014  (JP) ................................ 2014-061951
Apr. 7, 2014   (JP) ................................ 2014-078834

(51) Int. Cl.
*G06F 3/041*    (2006.01)
*G06F 3/044*    (2006.01)
(Continued)

(52) U.S. Cl.
CPC ............... *G06F 3/041* (2013.01); *B32B 3/10* (2013.01); *B32B 5/02* (2013.01); *B32B 5/028* (2013.01);
(Continued)

(58) Field of Classification Search
CPC ........ G06F 3/044; G06F 3/041; G06F 3/0416; G06F 2203/04111
See application file for complete search history.

(56) References Cited

U.S. PATENT DOCUMENTS 7,538,760 B2 * 5/2009 Hotelling .............. G06F 3/0414
178/18.06
7,849,424 B2 * 12/2010 Wolk .............. H01L 31/022466
700/120
(Continued)

FOREIGN PATENT DOCUMENTS

JP    2008-197913 A    8/2008
JP    2010-507199 A    3/2010
(Continued)

OTHER PUBLICATIONS

International Search Report issued in International Patent Application No. PCT/JP2015/001558 dated Jun. 9, 2015.
(Continued)

*Primary Examiner* — Vijay Shankar
(74) *Attorney, Agent, or Firm* — Foley & Lardner LLP

(57) ABSTRACT

A transparent conductive laminate which does not cause erroneous operation under high temperature and high humidity and a touch panel which includes the transparent conductive laminate are provided. The transparent conductive laminate includes a transparent base material; and a transparent electrode layer containing resin which is disposed on one or both sides of the transparent base material, wherein the transparent electrode layer includes a plurality of conductive regions which contain fibrous metals, and a non-conductive region, and the transparent electrode layer has a thickness of 30 nm or more and 150 nm or less.

10 Claims, 16 Drawing Sheets

(51) Int. Cl.
  *B32B 27/06* (2006.01)
  *B32B 3/10* (2006.01)
  *B32B 5/02* (2006.01)
  *B32B 5/14* (2006.01)
  *B32B 7/12* (2006.01)
  *B32B 15/02* (2006.01)
  *B32B 15/08* (2006.01)
  *B32B 15/082* (2006.01)
  *B32B 15/20* (2006.01)
  *B32B 27/08* (2006.01)
  *B32B 27/12* (2006.01)
  *B32B 27/36* (2006.01)

(52) U.S. Cl.
  CPC ............... *B32B 5/142* (2013.01); *B32B 7/12* (2013.01); *B32B 15/02* (2013.01); *B32B 15/08* (2013.01); *B32B 15/082* (2013.01); *B32B 15/20* (2013.01); *B32B 27/06* (2013.01); *B32B 27/08* (2013.01); *B32B 27/12* (2013.01); *B32B 27/36* (2013.01); *G06F 3/044* (2013.01); *B32B 2255/02* (2013.01); *B32B 2255/06* (2013.01); *B32B 2255/26* (2013.01); *B32B 2260/021* (2013.01); *B32B 2262/103* (2013.01); *B32B 2307/202* (2013.01); *B32B 2307/206* (2013.01); *B32B 2307/412* (2013.01); *B32B 2457/208* (2013.01); *G06F 2203/04111* (2013.01); *Y10S 977/762* (2013.01)

(56) References Cited

U.S. PATENT DOCUMENTS

| | | | |
|---|---|---|---|
| 8,094,247 B2* | 1/2012 | Allemand | B82Y 10/00 349/12 |
| 9,182,859 B2* | 11/2015 | Coulson | G06F 3/044 |
| 2008/0143906 A1 | 6/2008 | Allemand et al. | |
| 2014/0062934 A1 | 3/2014 | Coulson et al. | |

FOREIGN PATENT DOCUMENTS

| | | |
|---|---|---|
| JP | 2010-257178 A | 11/2010 |
| JP | 2013-050778 A | 3/2013 |
| JP | 2013-097932 A | 5/2013 |

OTHER PUBLICATIONS

Extended European Search Report issued in EP application No. 15768432.5 dated Sep. 22, 2017.

* cited by examiner

TRANSPARENT CONDUCTIVE LAMINATES AND TOUCH PANELS HAVING TRANSPARENT CONDUCTIVE LAMINATES

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2015/001558 filed on Mar. 19, 2015, which is based upon and claims the benefit of priority of Japanese Patent Application No. 2014-061951, filed on Mar. 25, 2014, and Japanese Patent Application No. 2014-078834, filed on Apr. 7, 2014, the entire contents of them all are hereby incorporated by reference.

TECHNICAL FIELD

The technology of the present disclosure relates to transparent conductive laminates and touch panels having transparent conductive laminates.

BACKGROUND

In recent years, capacitive touch panels are commonly used as input devices for electronics. Projecting type capacitive touch panels include two electrodes for detecting a change in capacitance. The two electrodes are opposed to each other with a transparent substrate interposed therebetween. Those electrodes are formed by patterning a transparent conductive film deposited on the substrate.

A typical material for the transparent conductive film deposited on the substrate as an electrode is indium tin oxide (ITO). A method for depositing ITO on the substrate is vacuum deposition in a dry method. However, a main component of ITO, indium, is a rare metal and a stable supply cannot be secured. Further, there is another problem that indium lacks flexibility. In addition to that, manufacturing of ITO needs an expensive vacuum deposition machine, leading to an increase in manufacturing cost.

In light of the above problems, alternative materials to ITO have emerged. Specifically, conductive films are formed by using conductive polymers, carbon nanotubes, metals formed in a fibrous shape or a mesh shape. Some of those materials can be dispersed in water or an organic solvent. Those dispersed liquids can be applied on the surface of the base material in a wet method. This also allows for mass production and cost reduction. In particular, the conductive film formed on the base material by using fibrous or mesh shaped metal seems to be promising as an alternative to ITO in that it exhibits a resistance and optical properties similar to those of ITO.

Although the touch panel having a conductive film formed of fibrous metals operates properly, it has a problem of lack of durability when used in the environment of high temperature and high humidity. Under an environment of high temperature and high humidity, malfunctions such as erroneous recognition of touch position and drop of capacitance can occur. It seems that those malfunctions occur due to migration of fibrous metals that form the electrodes. Migration is a phenomenon in which, when a voltage is applied to the electrodes under high temperature and high humidity, metal in the electrodes is ionized due to the presence of water, and the metal ions move from anode to cathode. Those ions receive electrons at the cathode, thereby allowing the metal to be deposited and grow on the surface of the insulator in the form of dendrites, bridges, clouds or the like. When the deposit reaches the anode, short-circuiting occurs, resulting in malfunctions. The base material used as the touch panel includes a plurality of electrodes in the shape of bars or diamonds which are arranged side by side. The adjacent electrodes are insulated by etching. In order to drive the base material as the touch panel, routed wirings are provided on each of the electrodes so that the electrodes are supplied with voltage from an IC circuit via a flexible printed circuit board (FPC). As the voltage is applied to each of the electrodes, migration of fibrous metals that form the electrodes occurs due to the effect of water under high temperature between the adjacent electrodes having potential difference. This causes a decrease in capacitance and short-circuit of electrodes, and as a result, the touch panel fails to operate properly.

In order to solve the problem, there is a technique of blocking water to prevent migration. For example, as described in PTL 1, a water blocking layer is provided to prevent water infiltration and thus prevent occurrence of migration. However, increase of the layers may cause problems such as increase in the touch panel thickness, increase in the amount of material and increase in the number of processes, which may lead to increase in costs.

Furthermore, a drive electrode and a sense electrode which form a sensor unit of capacitive touch panels are formed of a transparent conductive film (transparent electrode) and is generally connected to a metal wiring (wiring section). Such a touch panel is described in PTL 2. In the touch panel described in PTL 2, a dummy lead wiring is provided on each end of a lead wiring, and the dummy lead wiring is connected so as to be at a predetermined potential of a detection wiring which is not selected.

In general, in this type of touch panel, the wiring section or the sensor section is shielded from the effect of outside noise by covering the wiring section from the upper or lower side or providing a ground electrode outside the wiring section. When the ground electrode is provided in the same layer as the drive electrode, it is disposed so as to overlap the wiring of the sense electrode or disposed in the peripheral area. Further, when the ground electrode is provided in the same layer as the sense electrode, it is disposed so as to overlap the wiring of the drive electrode or disposed in the peripheral area.

In such a case, since an electric field of a specific direction is generated between the ground electrode and the drive electrode or the sense electrode, a problem has been raised depending on the material of the transparent conductive film used for the drive electrode or the sense electrode, in which the transparent conductive film becomes broken due to ion migration, or short-circuits between the transparent conductive film and the ground electrode. In particular, ion migration occurring under high temperature and high humidity has been a matter of concern.

CITATION LIST

Patent Literature

PTL 1: JP-A-2013-097932
PTL 2: JP-A-2010-257178

SUMMARY OF THE INVENTION

Technical Problem

The present invention has been made to try to overcome the above problems, and has an object of providing a transparent conductive laminate which can decrease erroneous operation under high temperature and high humidity, and providing a touch panel which includes the transparent conductive laminate.

Another object of the invention is to provide a transparent conductive laminate that can help to suppress generation of an electric field in a specific direction between the drive electrode or the sense electrode and the ground electrode, and provide a touch panel which includes the transparent conductive laminate.

Solution to Problem

In order to attempt to solve the above problems, an aspect of the present invention is a transparent conductive laminate including: a transparent base material; and a transparent electrode layer which contains a resin and is disposed on one or both sides of the transparent base material, wherein the transparent electrode layer includes a plurality of conductive regions which contain fibrous metals, and a non-conductive region, and the transparent electrode layer has a thickness of 30 nm or more and 150 nm or less.

Further, another aspect of the present invention is a touch panel which includes the above transparent conductive laminate.

Advantageous Effects of Invention

According to the transparent conductive laminate of the technology of the present disclosure, a touch panel which can help to suppress occurrence of short-circuit of electrodes due to ion migration, help to prevent erroneous operation under high temperature and high humidity, and has improved durability can be provided.

Further, by employing an electrode configuration of a touch sensor which can help to prevent occurrence of an electric field in a specific direction between the drive electrode or the sense electrode and the ground electrode, ion migration between the drive electrode or the sense electrode and the ground electrode can be more suppressed, thereby providing a touch panel with higher reliability.

DESCRIPTION OF REPRESENTATIVE EMBODIMENTS

It is understood that the descriptions below are representative embodiments of the invention, and that the invention is not limited to these representative embodiments. With reference to the drawings, a transparent conductive laminate, a touch panel and a method for manufacturing a transparent conductive laminate according to an embodiment of the present invention will be described. In the present embodiment, a transparent conductive laminate is one of components of the touch panel.

[Configuration of Transparent Conductive Laminate]

Figure 1:
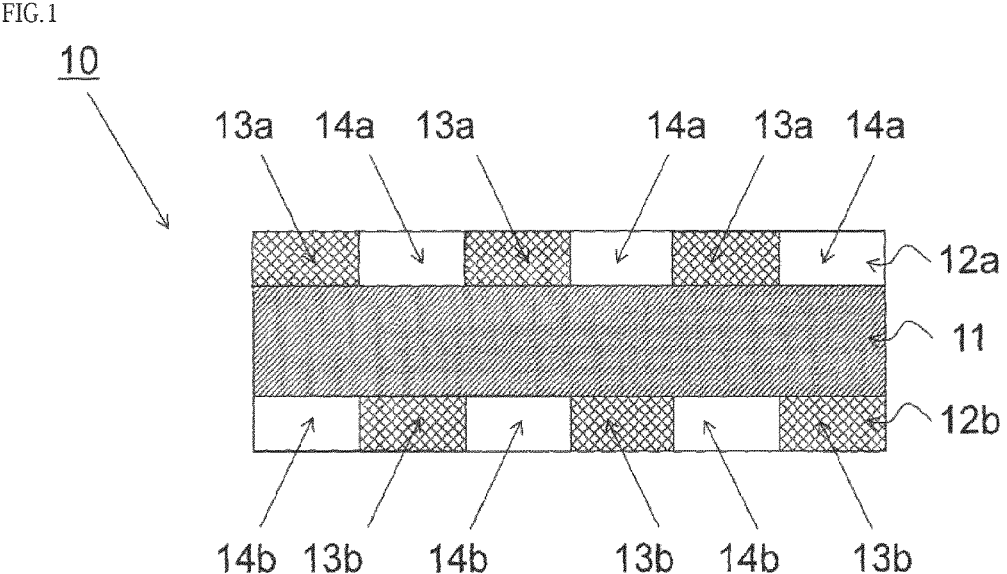
FIG. 1 is a cross sectional view of a transparent conductive laminate according to a first embodiment.

FIG. 1 is a cross sectional view of a transparent conductive laminate according to a first embodiment. As shown in FIG. 1, a transparent conductive laminate 10 includes a transparent substrate 11 (transparent base material), a transparent electrode layer 12a formed on a front surface (upper side in the drawing sheet; the same applies hereinafter) of the substrate 11, and a transparent electrode layer 12b formed on a rear surface (lower side in the drawing sheet; the same applies hereinafter) of the substrate 11. Two transparent electrode layers 12a, 12b are opposed with the substrate 11 interposed therebetween. The transparent electrode layer 12a is an example of the first transparent electrode layer, and the transparent electrode layer 12b is an example of the second transparent electrode layer.

Figure 2:
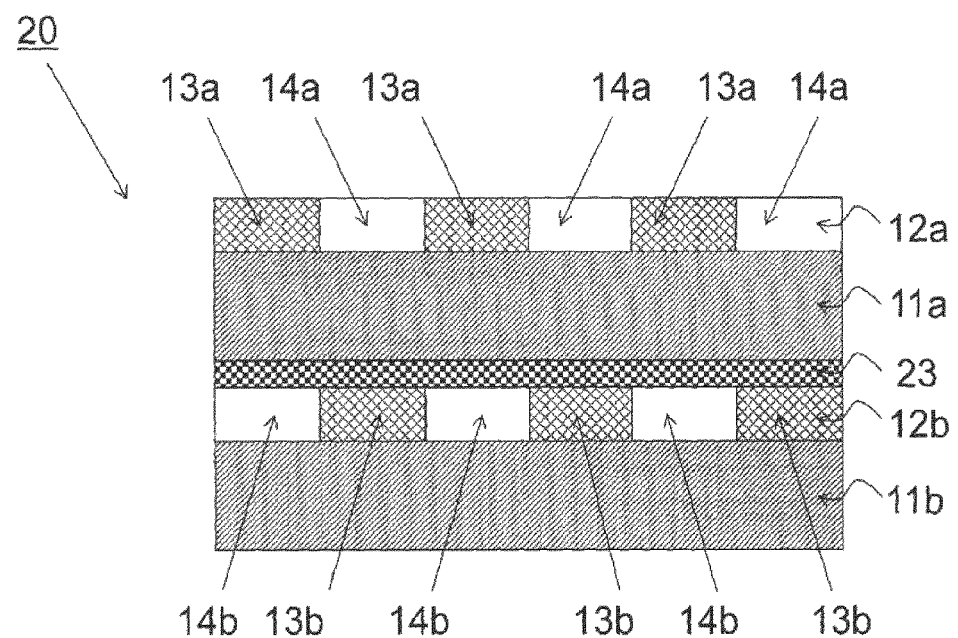
FIG. 2 is a cross sectional view of a transparent conductive laminate according to a second embodiment.

FIG. 2 is a cross sectional view of a transparent conductive laminate according to a second embodiment. As shown in FIG. 2, a transparent conductive laminate 20 includes a transparent substrate 11a, a transparent electrode layer 12a formed on the front surface of the substrate 11a, a transparent substrate 11b, a transparent electrode layer 12b formed on the front surface of the substrate 11b, and an adhesive layer 23 that bonds the substrate 11a and the transparent electrode layer 12b.

Figure 3:
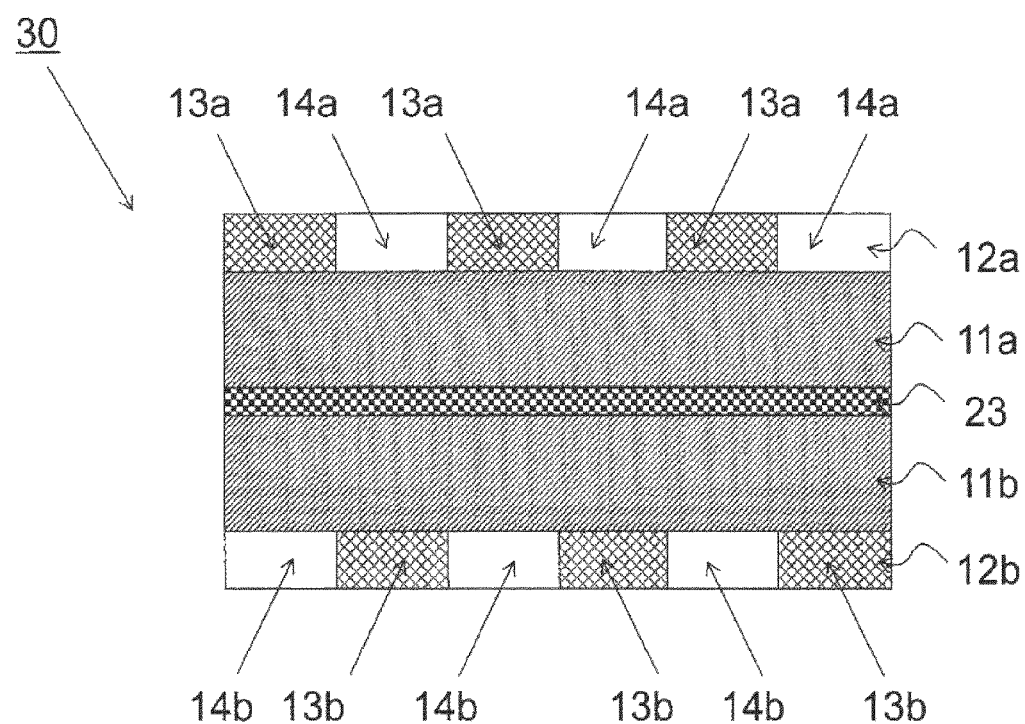
FIG. 3 is a cross sectional view of a transparent conductive laminate according to a third embodiment.

FIG. 3 is a cross sectional view of a transparent conductive laminate according to a third embodiment. As shown in FIG. 3, the transparent conductive laminate 30 includes the transparent substrate 11a, the transparent electrode layer 12a formed on the front surface of the substrate 11a, the transparent substrate 11b, the transparent electrode layer 12b formed on the front surface of the substrate 11b, and the adhesive layer 23 that bonds the substrate 11a and the substrate 11b.

With reference to FIG. 1, a configuration of the transparent conductive laminate will be described.

The substrate 11 may be formed of, for example, a glass or a resin film. The resin film may be made of any resin as long as the resultant film has the strength required for the substrate in a film forming process and a post process and has a surface smoothness. Materials used for the substrate 11 include, for example, soda-lime glass, PMMA, polyethylene terephthalate (PET), polybutylene terephthalate, polyethylene naphthalate, polycarbonate, polyethersulfone, polysulfone, polyarylate, cyclic polyolefin and polyimide. In order to reduce the thickness of the transparent conductive laminate 10 while maintaining the flexibility of the substrate 11, the substrate 11 is preferably a glass with a thickness of 50 µm or more and 1 mm or less. Alternatively, the substrate 11 is preferably a resin film with a thickness of 10 µm or more and 200 µm considering the reduced thickness of the member and the flexibility of the laminate. The same applies to the substrates 11a, 11b. Further, when the touch panel manufactured by using the substrate 11 is disposed on the front surface of the display, the substrate 11 needs to have high transparency, preferably 85% of total light transparency.

The substrate 11 may include a variety of additives or stabilizers. The additives or stabilizers include, for example, anti-static agents, plasticizers, lubricants and easy-adhesion agents. In order to enhance adhesiveness between the substrate 11 and the layer laminated on the substrate 11, the substrate 11 may be processed with pretreatment such as corona treatment, low temperature plasma treatment, ion bombardment treatment or chemical treatment. The same applies to the substrates 11a, 11b.

The transparent electrode layer 12a is formed of a resin, which is described later, laminated on the substrate 11, and includes a plurality of conductive regions 13a and a plurality of non-conductive regions 14a. Similarly, the transparent electrode layer 12b includes a plurality of conductive regions 13b and a plurality of non-conductive regions 14b.

The conductive regions 13a, 13b are formed by permitting the resin that forms the transparent electrode layers 12a, 12b to contain fibrous metals such as metal nanowires. Examples of fibrous metals include gold, silver, copper and cobalt. Fibrous metals in the conductive regions 13a, 13b are in contact with each other in the conductive regions 13a, 13b. Accordingly, the conductive regions 13a, 13b have electrically conductive properties. On the other hand, the non-conductive regions 14a, 14b do not include or hardly include fibrous metal in the transparent electrode layers 12a, 12b.

Figure 4:
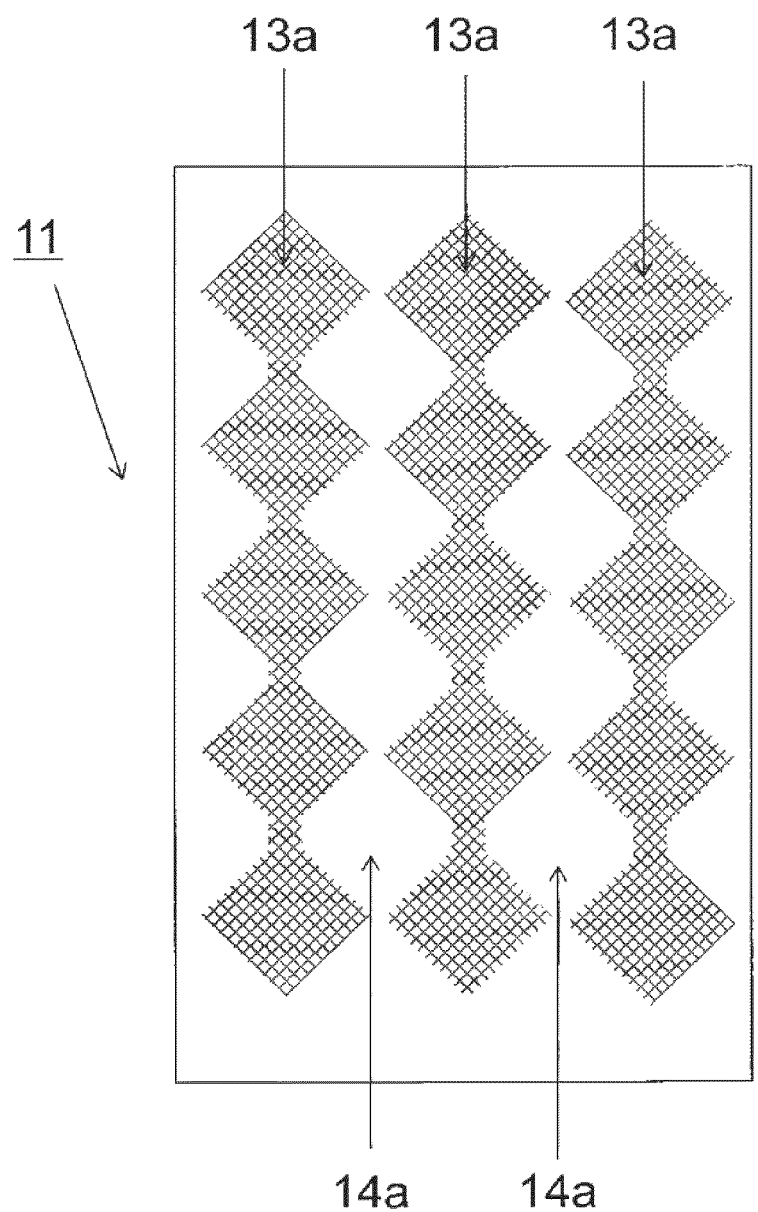
FIG. 4 is a plan view which shows mesh-shaped conductive regions according to an embodiment.
Figure 5:
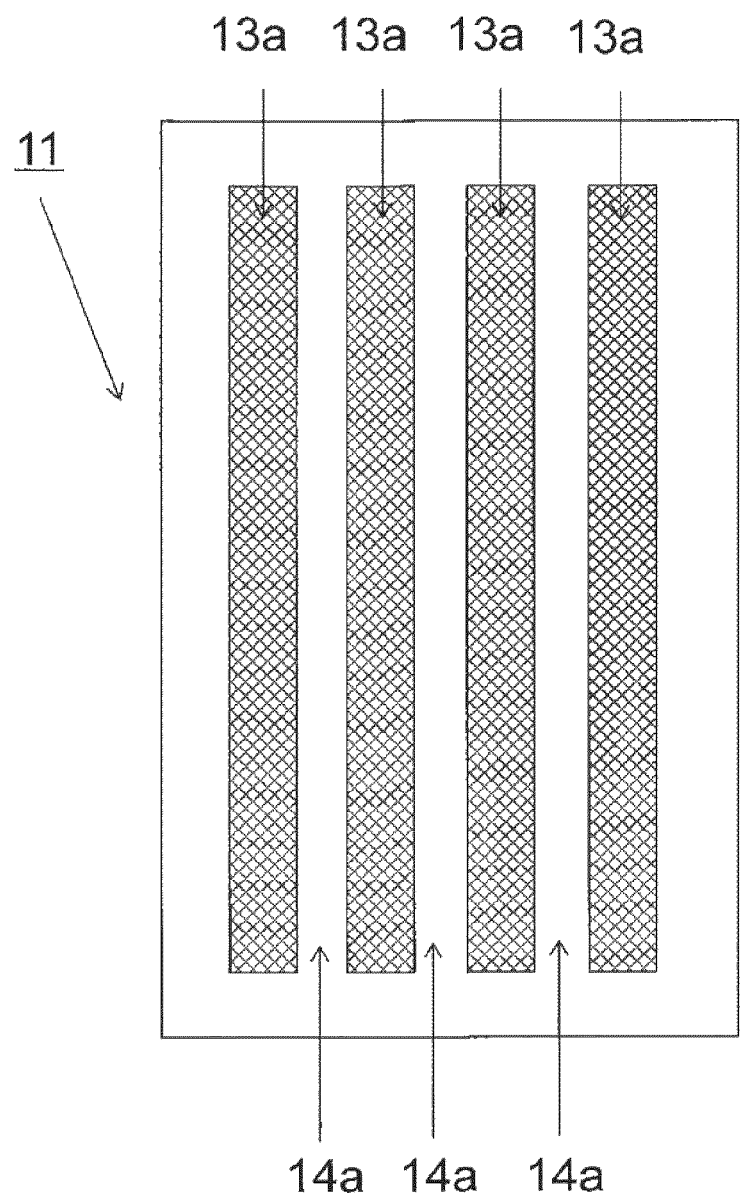
FIG. 5 is a plan view which shows strip-shaped conductive regions according to an embodiment.

In the transparent electrode layer 12a, the plurality of conductive regions 13a each extending, for example, in the X direction are arranged side by side with a space therebetween in Y direction which is perpendicular to the X direction. The non-conductive regions 14a are regions between the plurality of conductive regions 13a, and are insulated from the respective conductive regions 13a. In the transparent electrode layer 12b, which is opposed to the transparent electrode layer 12a, the plurality of conductive regions 13b each extending, for example, in the Y direction are arranged side by side with a space therebetween in X direction. The non-conductive regions 14b are regions between the plurality of conductive regions 13b, and are insulated from the respective conductive regions 13b. The conductive regions 13a, 13b are, for example, each formed in a mesh shape as shown in FIG. 4 or a strip shape as shown in FIG. 5. For the convenience of illustrating the configuration of the respective conductive regions and non-conductive regions, each cross sectional view show the juxtaposing direction of the conductive regions on both surfaces of the substrate as the same direction.

Each of the conductive regions 13a, 13b can be connected to a circuit, which is not shown in the figure, that detects a change in capacitance which occurs in the conductive regions 13a, 13b on the basis of change in electric current. The capacitance varies when a user's finger approaches the conductive regions 13a, 13b. From the detected change in capacitance, a contact position of the user's finger is determined, and thus two dimensional positional information is obtained.

The transparent electrode layer 12a includes resin. Further, the transparent electrode layer 12b also includes resin. The transparent electrode layers 12a, 12b made of resin can prevent fibrous metals from being separated from the conductive regions 13a, 13b, while improving mechanical strength of the transparent conductive laminate 10 and enhancing durability by protecting the fibrous metals.

Resins forming the transparent electrode layers 12a, 12b are not specifically limited, but are preferably resins having transparency, appropriate hardness and mechanical strength. Specific examples are preferably photo-curable resins such as monomers or cross-linking oligomers having a main component of tri- or higher functional acrylate which is expected to form a 3D cross-linked structure.

The tri- or higher functional acrylate monomers are preferably trimethylolpropane triacrylate, EO-modified isocyanurate triacrylate, pentaerythritol triacrylate, dipentaerythritol triacrylate, dipentaerythritol tetraacrylate, dipentaerythritol pentaacrylate, dipentaerythritol hexaacrylate, ditrimethylol tetraacrylate, pentaerythritol tetraacrylate and polyester acrylate. In particular, either of isocyanurate EO-modified triacrylate or polyester acrylate is preferably used. Those acrylate monomers may be used alone or in combination of two or more. Further, in addition to those tri- or higher functional acrylates, acrylic resins such as epoxy acrylate, urethane acrylate and polyol acrylate may also be used.

The cross-linking oligomers are preferably acryl oligomers such as polyester (meth)acrylate, polyether (meth)acrylate, polyurethane (meth)acrylate, epoxy (meth)acrylate or silicone (meth)acrylate. Specific examples include polyethylene glycol di(meth)acrylate, polypropyleneglycol di(meth)acrylate, bisphenol A epoxy acrylate, diacrylate of polyurethane, and cresol novolac epoxy (meth)acrylate.

The resin that forms the transparent electrode layers 12a, 12b may contain additives such as a polymerization initiator. When a photopolymerization initiator is added as a polymerization initiator, examples of a radical generating photopolymerization initiator include benzoins and alkyl ethers thereof such as benzoin, benzoin methyl ether, benzoin ethyl ether, benzoin isopropyl ether, benzyl methyl ketal, acetophenones such as acetophenone, 2,2-dimethoxy-2-phenyl acetophenone, 1-hydroxycyclohexyl phenyl ketone, anthraquinones such as methyl anthraquinone, 2-ethyl anthraquinone, 2-amylanthraquinone, thioxanthones such as thioxanthone, 2,4-diethylthioxanthone, 2,4-diisopropylthioxanthone, ketals such as acetophenone dimethyl ketal, benzyl dimethyl ketal, benzophenones such as benzophenone, 4,4-bismethyl aminobenzophenone and azo compounds. Those photopolymerization initiators may be used alone or in combination of two or more polymerization initiators. Further, those photopolymerization initiators may be used in combination with photoinitiation assistants, for example, tertiary amines such as triethanolamine and methyldiethanolamine, or benzoic acid derivatives such as 2-dimethylamino ethylbenzoate and 4-dimethylamino ethylbenzoate.

The transparent electrode layers $12a$, $12b$ may have any thickness as long as it ensures the durability of the fibrous metals and prevents the metal from detaching. However, if the transparent electrode layers $12a$, $12b$ have a too large thickness, the metal covered with the resin has low conductivity. For those reasons, the thickness of the transparent electrode layers $12a$, $12b$ is preferably 30 nm or more and 150 nm or less.

Further, the transparent conductive laminate $10$ preferably has a thermal shrinkage percentage of 0.5% or less when left at a temperature of 150° C. for a period of 30 minutes. When the thermal shrinkage percentage is within the above range, the transparent conductive laminate $10$ is prevented from being shrunk by heat applied during manufacturing processes. As a result, the patterns of the transparent electrode layer $12a$ and the transparent electrode layer $12b$ can be prevented from being displaced.

Further, the transparent conductive laminate $10$ may include an additional layer between the substrate $11$ and the transparent electrode layer $12a$ or between the substrate $11$ and the transparent electrode layer $12b$. Examples of such an additional layer are, for example, a layer which enhances the adhesiveness between the substrate $11$ and the transparent electrode layers $12a$, $12b$ or a layer which reinforces the mechanical strength of the transparent conductive laminate $10$.

The substrate $11$ may be provided with a resin layer $2$ on one or both surfaces. In particular, the resin layer $2$ is formed when a plastic material is used for the substrate $11$ in order to impart a mechanical strength to the substrate $11$ or the transparent electrode layers $12a$, $12b$. Resins used for the resin layer $2$ are not specifically limited, but are preferably resins having transparency, appropriate hardness and mechanical strength. Specifically, photo-curable resins such as monomers or cross-linking oligomers having a main component of tri- or higher functional acrylate which is expected to form a 3D cross-linked structure are preferable.

Preferably, examples of the tri- or higher functional acrylate monomers include, for example, trimethylolpropane triacrylate, EO-modified isocyanurate triacrylate, pentaerythritol triacrylate, dipentaerythritol triacrylate, dipentaerythritol tetraacrylate, dipentaerythritol pentaacrylate, dipentaerythritol hexaacrylate, ditrimethylol tetraacrylate, pentaerythritol tetraacrylate and polyester acrylate. Specifically, EO-modified isocyanurate triacrylate and polyester acrylate are more preferable. They may be used alone, or in combination of two or more. Further, in addition to those tri- or higher functional acrylates, so called acrylic resin such as epoxy acrylate, urethane acrylate and polyol acrylate may also be used.

The cross-linking oligomers are preferably acryl oligomers such as polyester (meth)acrylate, polyether (meth)acrylate, polyurethane (meth)acrylate, epoxy (meth)acrylate or silicone (meth)acrylate. Specifically, polyethylene glycol di(meth)acrylate, polypropyleneglycol di(meth)acrylate, bisphenol A epoxy acrylate, diacrylate of polyurethane, and cresol novolac epoxy (meth)acrylate may be used.

The resin layer $2$ may further contain additives such as particles or photopolymerization initiator.

The particles used for the resin layer $2$ may be organic or inorganic particles. However, considering transparency, organic particles are preferable. The organic particles may be particles formed of acryl resin, polystyrene resin, polyester resin, polyolefin resin, polyamide resin, polycarbonate resin, polyurethane resin, silicone resin and fluororesin.

The average particle diameter varies depending on the thickness of the resin layer $2$. For the reason of outer appearance such as haze, the lower limit of the particle diameter is preferably 2 μm or more, more preferably 5 μm or more, and the upper limit of the particle diameter is preferably 30 μm or less, more preferably 15 μm or less. Further, for the same reason, the content of the particles is preferably 0.5 wt % or more and 5 wt % or less of the resin.

When a photopolymerization initiator is added, examples of a radical generating photopolymerization initiator include benzoins and alkyl ethers thereof such as benzoin, benzoin methyl ether, benzoin ethyl ether, benzoin isopropyl ether, benzyl methyl ketal, acetophenones such as acetophenone, 2,2-dimethoxy-2-phenyl acetophenone, 1-hydroxycyclohexyl phenyl ketone, anthraquinones such as methyl anthraquinone, 2-ethyl anthraquinone, 2-amylanthraquinone, thioxanthones such as thioxanthone, 2,4-diethylthioxanthone, 2,4-diisopropylthioxanthone, ketals such as acetophenone dimethyl ketal, benzyl dimethyl ketal, benzophenones such as benzophenone, 4,4-bismethyl aminobenzophenone or azo compounds. They may be used alone or as a mixture of two or more, or alternatively, may be used in combination with a photoinitiation assistant, for example, tertiary amines such as triethanolamine and methyldiethanolamine, or benzoic acid derivatives such as 2-dimethylamino ethylbenzoate and 4-dimethylamino ethylbenzoate.

The addition amount of the photopolymerization initiator is in the range from 0.1 wt % or more to 5 wt % or less, and more preferably, 0.5 wt % or more to 3 wt % or less of the main component resin. If the amount is less than the lower limit, the resin layer $2$ (hard coating layer) is not sufficiently cured, which is not desirable. Further, if the amount is over the upper limit, the resin layer $2$ (hard coating layer) has yellow discoloration or decreases in weather resistance, which is not desirable. Light used for curing a photo-curable resin is ultraviolet rays, electron beams, gamma rays or the like. In the case of electron beams or gamma rays, a photopolymerization initiator or a photoinitiation auxiliary may not be necessarily added. The radiation source may be a high pressure mercury lamp, xenon lamp, metal halide lamp, accelerated electron generator or the like.

Further, although the thickness of the resin layer $2$ is not specifically limited, it is preferably in the range from 0.5 μm or more to 15 μm or less. More preferably, the resin layer $2$ has the same or approximately same refractive index as that of the transparent substrate $11$, which is preferably in the order of 1.45 or more and 1.75 or less.

A method for forming the resin layer $2$ may be a known coating method which applies coating liquid containing a main component such as resin dissolved in a solvent by using a coating machine such as a die coater, curtain flow coater, roll coater, reverse roll coater, gravure coater, knife coater, bar coater, spin coater and micro gravure coater.

The solvent is not specifically limited as long as it dissolves the above main component such as resin. Specifically, the solvent includes ethanol, isopropyl alcohol, isobutyl alcohol, benzene, toluene, xylene, acetone, methyl ethyl ketone, methyl isobutyl ketone, ethyl acetate, n-butyl acetate, isoamyl acetate, ethyl lactate, methyl cellosolve, ethyl cellosolve, butyl cellosolve, methyl cellosolve acetate and propyleneglycol monomethyl ether acetate. Those solvents may be used alone or in combination of two or more.

Further, when the transparent electrode layers 12a, 12b are patterned by a method such as etching, an optical adjustment layer can be provided so that the pattern is not easily seen by visual observation. The optical adjustment layer is formed by a single layer or a plurality of layers of thin films made of materials such as inorganic oxides or organic compounds having a predetermined refractive index. The optical adjustment layer can provide pattern invisibility by adjusting the transmission ratio, reflection ratio, hue and the like between the regions having the transparent conductive film and not having the transparent conductive film.

Further, an adhesion layer made of metal, metal oxide, resin or silane coupling agent may be provided as an underlayer of the transparent electrode layers 12a, 12b or the optical adjustment layer.

In order to protect the transparent electrode layers 12a, 12b and impart a mechanical strength to the transparent electrode layers 12a, 12b, a cured film may be provided. Resins used for the cured film are not specifically limited, but are preferably resins having transparency, appropriate hardness and mechanical strength. Specifically, photo-curable resins such as monomers or cross-linking oligomers having a main component of tri- or higher functional acrylate which is expected to form a 3D cross-linked structure are preferable, and the same materials as those of the resin layer 2 may be used. A method for manufacturing the cured film may also be the same as that for the resin layer 2.

Figure 6:
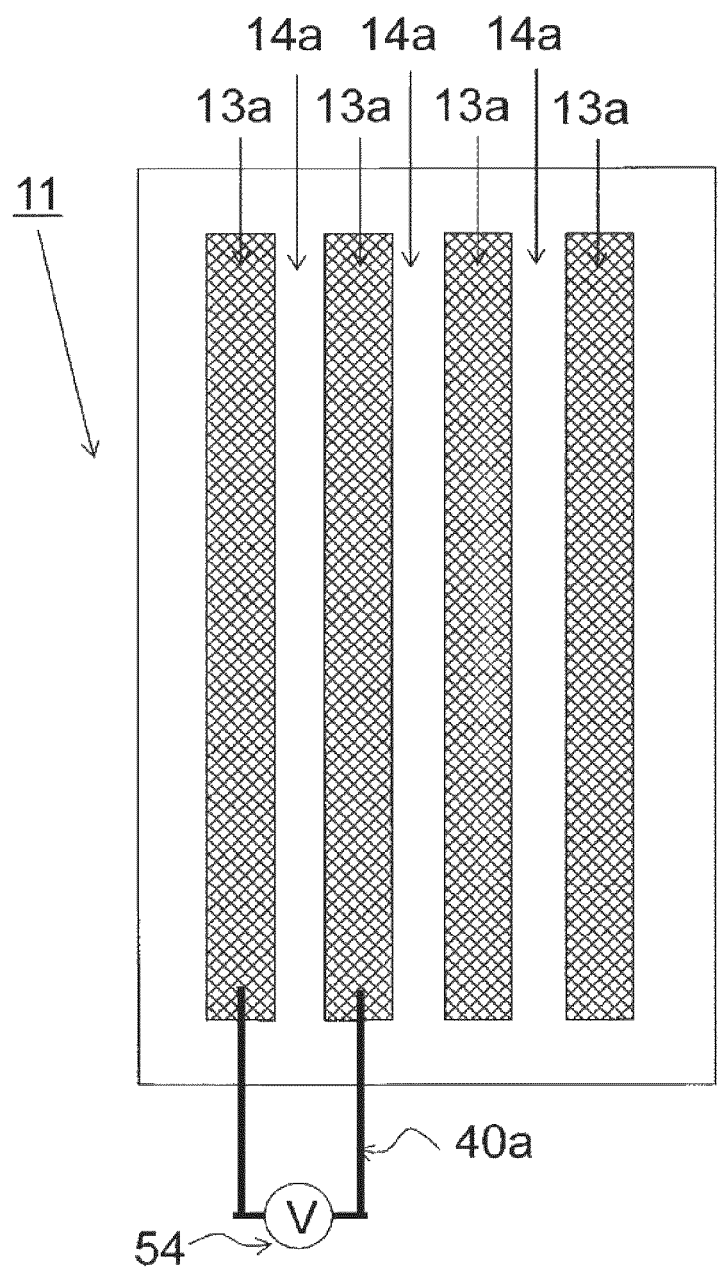
FIG. 6 is a view which shows that a voltage is applied to two adjacent conductive regions in a transparent electrode layer according to an embodiment.

The plurality of conductive regions 13a, 13b formed in the transparent electrode layers 12a, 12b are each insulated from each other. The conductive regions are preferably in such a state that the adjacent two conductive regions are insulated from each other for a period of at least 240 hours when a voltage is applied to the adjacent two conductive regions under the atmosphere of high temperature and high humidity (for example, temperature of 60° C., humidity of 90% RH). For evaluation of this state, wirings 40a formed of silver paste or the like can be provided for the conductive regions 13a, 13b as shown in FIG. 6 and can be connected to a voltage applying device 54. An insulated state between two adjacent conductive regions 13a, 13b can be determined by measuring an electric current value and converting the measured electric current value into a resistance value. Interwire insulation evaluation devices are preferably used as devices for measuring electric current values or resistance values for a predetermined period of time by applying a voltage under the atmosphere of high temperature and high humidity. The period of time for two adjacent conductive regions 13a, 13b to be insulated is set to be at least 240 hours. The reason for that is, according to general criteria, the quality can be assured if it does not change for at least 240 hours in an environmental test of the electronic device. Further, the resistance value in the insulated state is preferably $10^9$ Ω or more.

Moreover, the state in which two adjacent conductive regions 13a, 13b are insulated from each other for a period of at least 240 hours when a voltage is applied to the two adjacent conductive regions 13a, 13b under the atmosphere of high temperature and high humidity depends on the state of fibrous metals remaining in the non-conductive regions 14a, 14b between the two adjacent conductive regions 13a, 13b. The conductive regions 13a, 13b and the non-conductive regions 14a, 14b are formed by etching or the like. The conductive regions 13a, 13b exhibit conductive properties when the fibrous metals are in contact with each other. On the other hand, the non-conductive regions 14a, 14b do not exhibit conductive properties when the fibrous metals remaining in the non-conductive regions 14a, 14b are cut off and are not in contact with each other. However, although the non-conductive regions 14a, 14b do not exhibit conductive properties, in the case where a large amount of fibrous metals remains in the non-conductive regions 14a, 14b, the fibrous metals remaining in the non-conductive regions 14a, 14b promote the growth of metal and thereby induce migration when a voltage is applied to the conductive regions 13a, 13b under the atmosphere of high temperature and high humidity. As a consequence, electric current flows between two adjacent conductive regions 13a, 13b, leading to decrease in insulation resistance. Accordingly, it is preferable to perform etching so that the fibrous metals do not remain in the non-conductive regions 14a, 14b in order to maintain insulation between two electrodes for a period of at least 240 hours when a voltage is applied to the two adjacent conductive regions 13a, 13b under the atmosphere of high temperature and high humidity. The remaining state of fibrous metals can be observed by an optical microscope or the like.

For the purpose of not allowing fibrous metals to remain in the non-conductive regions 14a, 14b, the thickness of the transparent electrode layers 12a, 12b is preferably 30 nm or more and 150 nm or less. If the thickness is more than 150 nm, etching proceeds slowly. This causes an increase in the amount of remaining fibrous metal even if the non-conductive regions 14a, 14b are electrically insulated. If the thickness is less than 30 nm, the metal layer is not protected and the durability of fibrous metals is not maintained as described above.

It is also possible to increase the distance between two adjacent conductive regions 13a, 13b so as to render the two adjacent conductive regions 13a, 13b insulated from each other for a period of at least 240 hours when a voltage is applied to the two adjacent conductive regions 13a, 13b under the atmosphere of high temperature and high humidity. However, an increased distance may cause a problem such as increase in size of the touch panel or invisibility of pattern. Accordingly, the distance is preferably in the range from 50 μm or more to 500 μm or less.

It is also preferable to cover the conductive regions 13a, 13b with a cover material or the like in order to evaluate the state in which two adjacent conductive regions 13a, 13b are insulated for a period of at least 240 hours when a voltage is applied to the two adjacent conductive regions 13a, 13b under the atmosphere of high temperature and high humidity. In the actual touch panels, electrodes are covered with a cover layer or a display panel and are not exposed to the outside. For an evaluation in a similar state, it is preferable to cover the electrodes with a cover material or the like. The protective material may be provided by applying curable resin, adhering a film via an adhesive material or the like.

Figure 7:
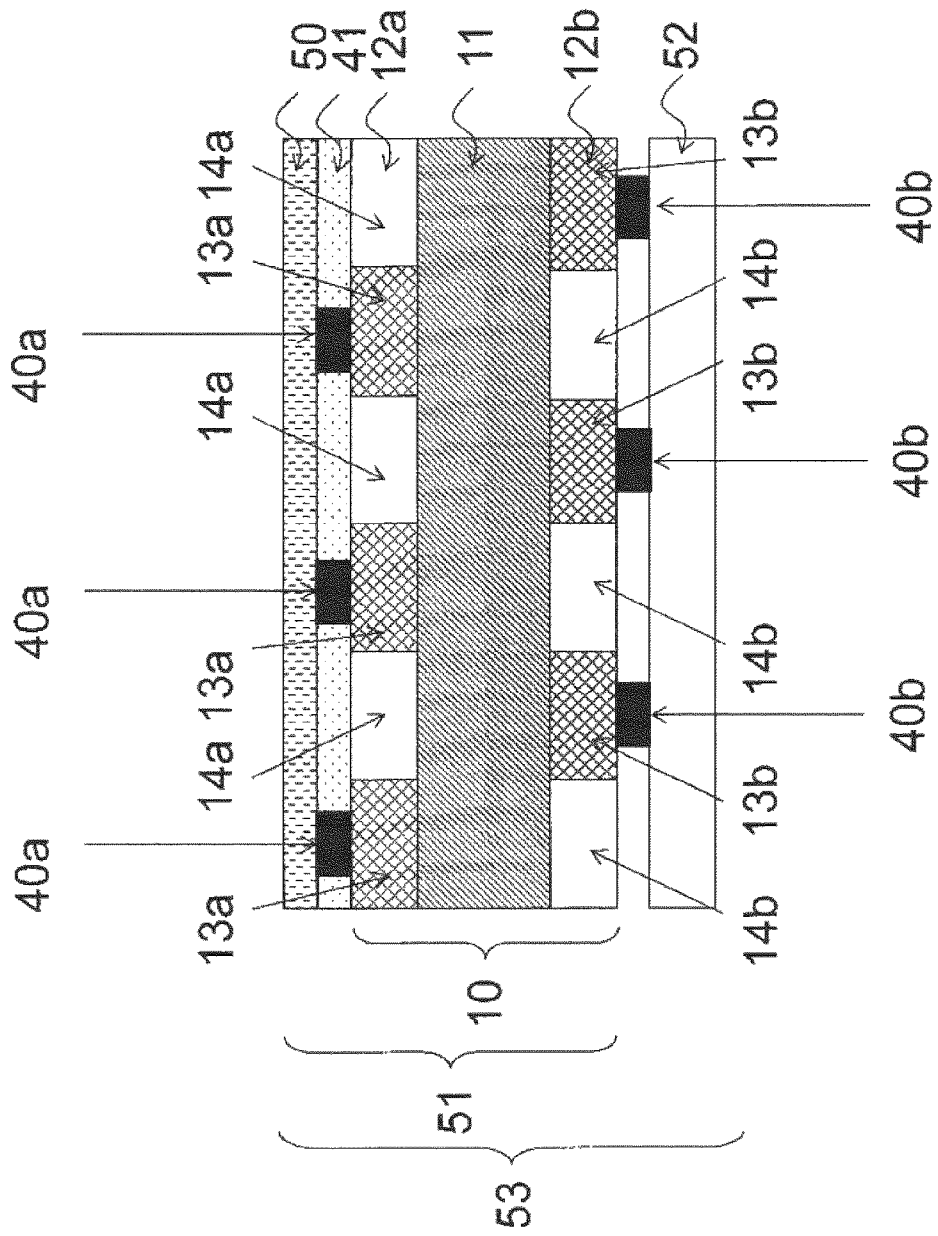
FIG. 7 is a cross sectional view which shows a touch panel according to an embodiment.

As shown in FIG. 7, routed wirings 40a, 40b connected to an IC circuit which drives the touch panel are provided on the conductive regions 13a, 13b. Further, on the transparent electrode layer 12a on the front surface of the substrate 11, a cover layer 50 or the like which is made of glass or the like is laminated via an adhesive layer 41 to form a touch panel 51. The surface of the cover layer 50 provides a contact surface for a user's finger or the like. Further, on the transparent electrode layer 12b on the rear surface of the substrate 11, a display panel 52 formed of a liquid crystal panel or the like is laminated such that the touch panel 51 and the display panel 52 forms a display device 53.

[Manufacturing Method of Transparent Conductive Laminate]

With reference to FIGS. 8 to 15, a method for manufacturing the transparent conductive laminate 10, which is show in FIG. 1 as a typical example, will be described.

Figure 8:
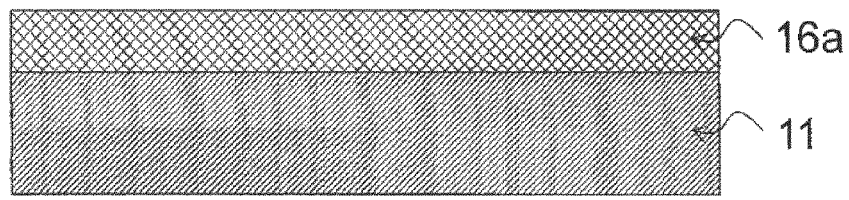
FIG. 8 is a view which shows a manufacturing process of the transparent conductive laminate according to an embodiment, and shows a manufacturing process of a metal layer on a front surface of a substrate.

As shown in FIG. 8, a metal layer 16a is first formed on the front surface of the substrate 11. The metal layer 16a is formed by applying a solution containing dispersed fibrous metals on the substrate 11. Solvents that disperse fibrous metals are preferably water or hydrophilic solvent such as alcohol-based solvent, specifically, methanol, ethanol, isopropanol or the like. Those solvents may be used alone or in combination of two or more.

A method for manufacturing the metal layer 16a is a known method such as coating methods including spin coating, roller coating, bar coating, dip coating, gravure coating, curtain coating, die coating, spray coating, doctor coating and kneader coating, and printing methods including screen printing, spray printing, ink jet printing, relief printing, intaglio printing and planographic printing.

Figure 9:
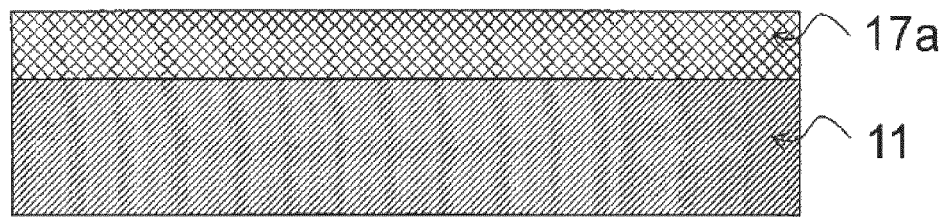
FIG. 9 is a view which shows a manufacturing process of the transparent conductive laminate according to an embodiment, and shows a manufacturing process of a transparent conductive layer on a front surface of a substrate.

Then, as shown in FIG. 9, a solution containing constituents of the resin that forms the transparent electrode layer 12a is applied on the metal layer 16a so as to form a transparent conductive layer 17a made up of the metal layer 16a and the resin. The solvent which dissolves constituents of the resin is not specifically limited as long as it dissolves acrylate which is the aforementioned main component. Specific examples of the solvent include ethanol, isopropyl alcohol, isobutyl alcohol, benzene, toluene, xylene, acetone, methyl ethyl ketone, methyl isobutyl ketone, ethyl acetate, n-butyl acetate, isoamyl acetate, ethyl lactate, methyl cellosolve, ethyl cellosolve, butyl cellosolve, methyl cellosolve acetate and propyleneglycol monomethyl ether acetate. Those solvents may be used alone or in combination of two or more.

The solution containing the resin applied on the metal layer 16a is also distributed into a space between the fibrous metals in the metal layer 16a. A method for applying the solution is a known method similarly to the method for forming the metal layer 16a described above. The method for applying the solution may be the same or different from that of the metal layer 16a.

Figure 10:
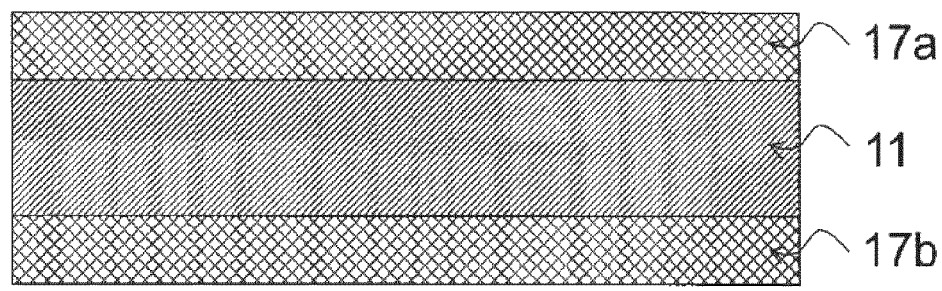
FIG. 10 is a view which shows a manufacturing process of the transparent conductive laminate according to an embodiment, and shows a manufacturing process of the transparent conductive layer on a rear surface of a substrate.

As shown in FIG. 10, a metal layer 16b is then formed on the rear surface of the substrate 11. The metal layer 16b is formed by the same method as that of the metal layer 16a. Then, a solution containing constituents of the resin that forms the transparent electrode layer 12b is applied on the metal layer 16b so as to form a transparent conductive layer 17b made up of the metal layer 16b and the resin. The transparent conductive layer 17b is formed by the same method as that of the conductive layer 17a. The metal layer 16a is an example of a first metal layer, and the metal layer 16b is an example of a second metal layer. Furthermore, the transparent conductive layer 17a is an example of a first transparent conductive layer, and the transparent conductive layer 17b is an example of a second transparent conductive layer.

Next, the conductive regions 13a, 13b and the non-conductive regions 14a, 14b are formed in the transparent conductive layers 17a, 17b by patterning. The patterning method may be any pattern forming method such as wet etching by photolithography or dry etching by laser. As an example, a method by photolithography is described below.

Figure 11:
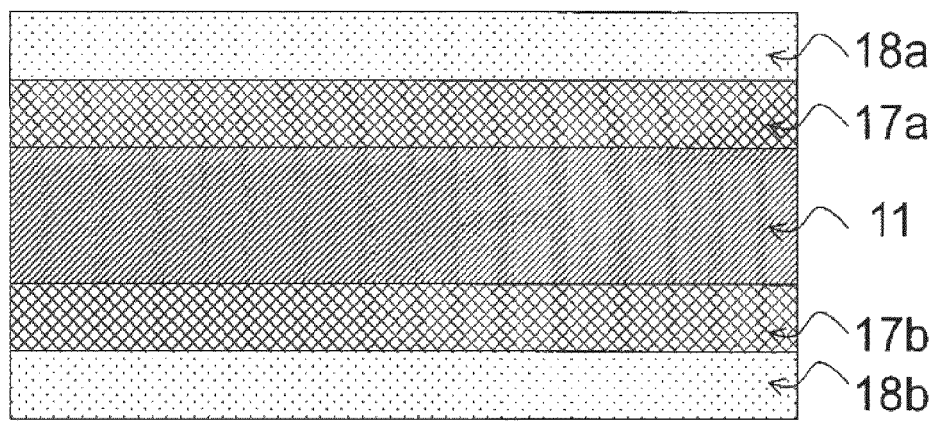
FIG. 11 is a view which shows a manufacturing process of the transparent conductive laminate according to an embodiment, and shows a manufacturing process of a resist.

As shown in FIG. 11, a resist 18a is formed on the surface of the transparent conductive layer 17a on the front surface of the substrate 11, and a resist 18b is formed on the surface of the transparent conductive layer 17b on the rear surface of the substrate 11.

The resists 18a, 18b may be a negative resist or a positive resist. The resists 18a, 18b are made by using a known material and manufactured by a known method.

Figure 12:
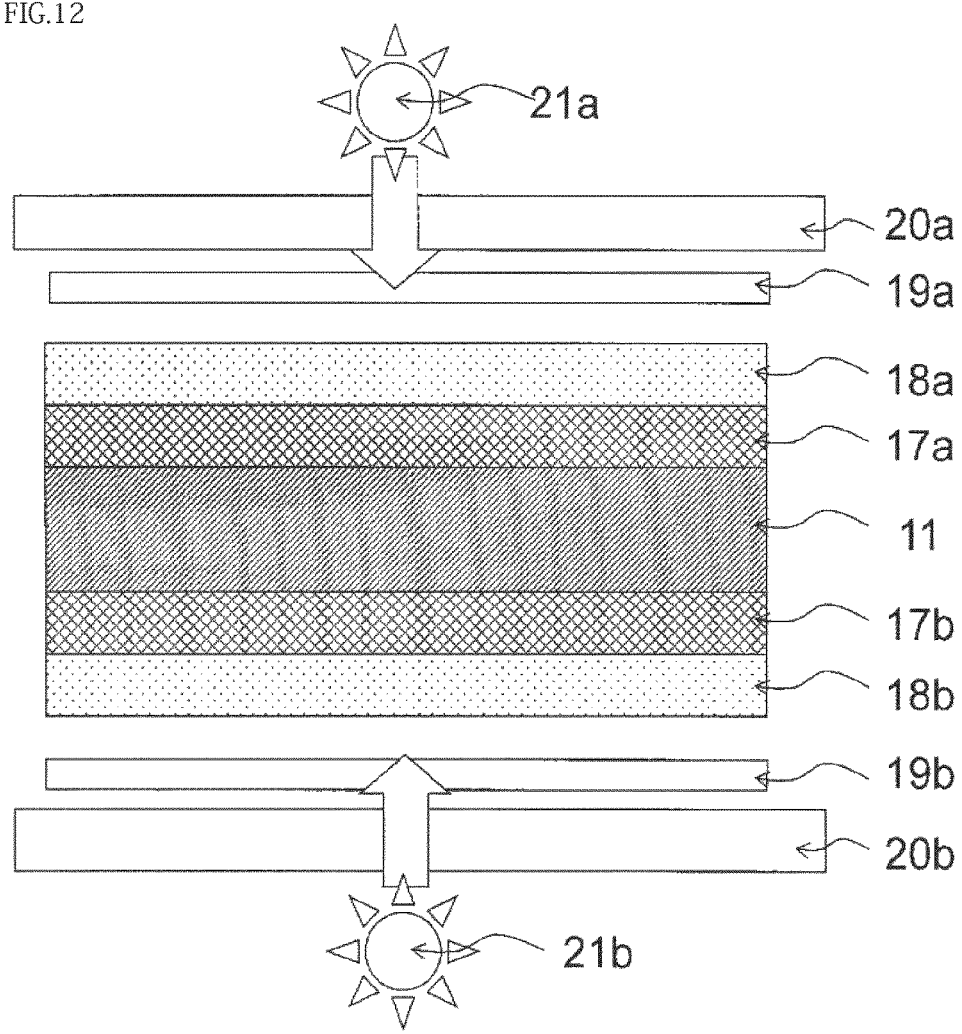
FIG. 12 is a view which shows a manufacturing process of the transparent conductive laminate according to an embodiment, and shows a light exposure process.

Then, as shown in FIG. 12, the laminate which includes the resists 18a, 18b is disposed between two light sources 21a, 21b that emit light to the resists 18a, 18b. On the front surface side of the substrate 11 between the resist 18a and the light source 21a, a mask 19a having a pattern corresponding to a pattern of the conductive region 13a of the transparent electrode layer 12a and an optical filter 20a that shields light of a predetermined wave length are disposed on the resist 18a in this order. On the rear surface side of the substrate 11 between the resist 18b and the light source 21b, a mask 19b having a pattern corresponding to a pattern of the conductive region 13b of the transparent electrode layer 12b and an optical filter 20b that shields light of a predetermined wave length are disposed on the resist 18b in this order.

Then, light is emitted from the light source 21a to the resist 18a so that the resist 18a is exposed to light, while light is emitted from the light source 21b to the resist 18b so that the resist 18b is exposed to light. Light exposure to the resist 18a and light exposure to the resist 18b may be performed in sequence or at the same time. However, if light exposure to the resist 18a and the resist 18b are performed at the same time, it is necessary to insert a layer that absorbs light between two transparent electrode layers so that the pattern of one transparent electrode layer is not reflected to the pattern of the other transparent electrode layer. The layer that absorbs light may be provided by imparting a light absorbing function to a substrate 11 or by inserting a light absorbing layer between the substrate 11 and the transparent electrode layers 12a, 12b.

Figure 13:
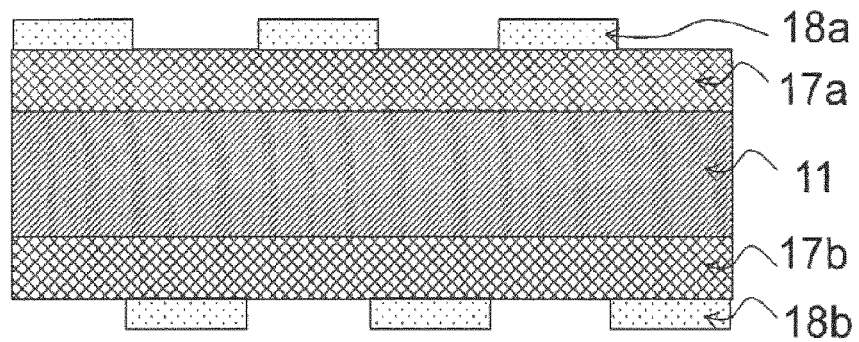
FIG. 13 is a view which shows a manufacturing process of the transparent conductive laminate according to an embodiment, and shows a development process.

As shown in FIG. 13, when the resists 18a, 18b are negative type, a portion of the resists 18a, 18b which is not exposed to light is removed by liquid developer. Alternatively, when the resists 18a, 18b are positive type, a portion of the resists 18a, 18b which is exposed to light is removed by liquid developer. Accordingly, patterns corresponding to the masks 19a, 19b are formed on the resists 18a, 18b. That is, patterns of the conductive regions 13a, 13b in the transparent electrode layers 12a, 12b are formed as patterns of the resists 18a, 18b.

Figure 14:
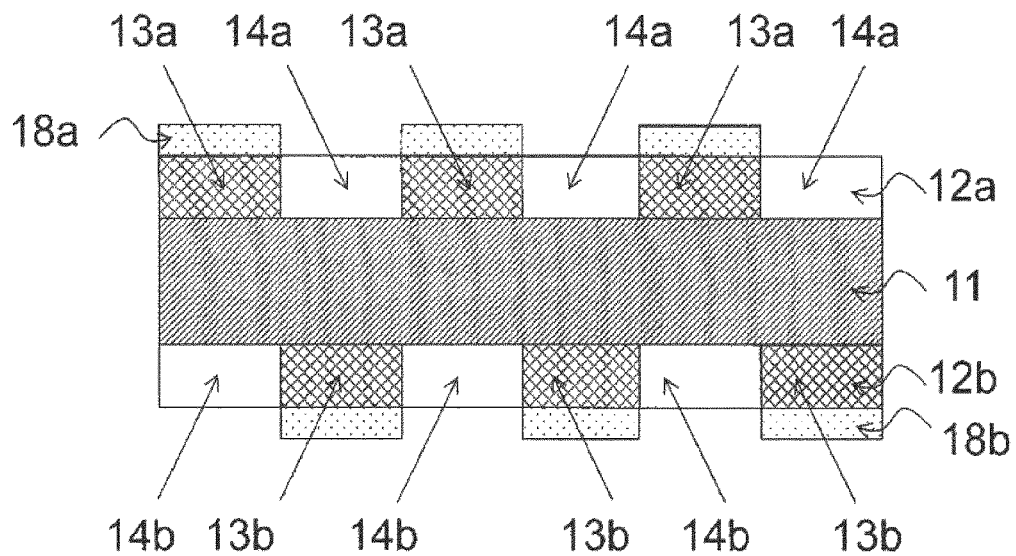
FIG. 14 is a view which shows a manufacturing process of the transparent conductive laminate according to an embodiment, and shows an etching process.

Then, as shown in FIG. 14, exposed portion of the transparent conductive layer 17a is etched in accordance with the pattern of the resist 18a, and exposed portion of the transparent conductive layer 17b is etched in accordance with the pattern of the resist 18b. Etching is performed by a known method such as immersing the laminate in acid or alkaline solution. Accordingly, in the portion of the transparent conductive layers 17a, 17b which is not covered by the resists 18a, 18b, the metal layers 16a, 16b are removed due to corrosion of fibrous metal, remaining the resin. As a result, the non-conductive regions 14a, 14b are provided in the portion of the transparent conductive layer 17a, 17b which is not covered by the resists 18a, 18b, and the conductive regions 13a, 13b are provided in the portion covered by the resists 18a, 18b. Consequently, the metal layer 16a in the transparent conductive layer 17a is patterned to form the transparent electrode layer 12a. Further, the metal layer 16b in the transparent conductive layer 17b is patterned to form the transparent electrode layer 12b.

Figure 15:
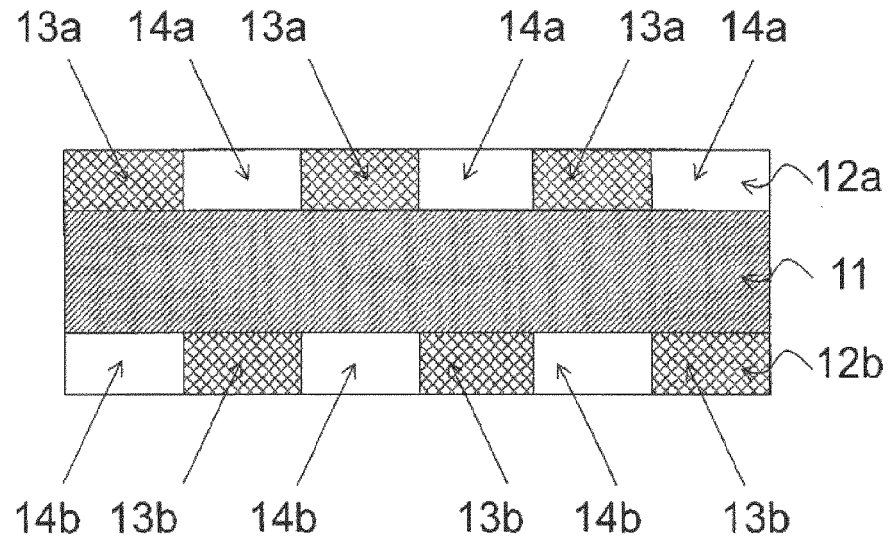
FIG. 15 is a view which shows a manufacturing process of the transparent conductive laminate according to an embodiment, and shows a removing process of a resist.

As shown in FIG. 15, the resists 18a, 18b are then removed. Accordingly, the transparent conductive laminate 10 can be obtained.

In the transparent conductive laminate 20 shown in FIG. 2, the metal layer 16a is formed on the front surface of the substrate 11a, and a solution containing constituents of the resin that forms the transparent electrode layer 12a is applied on the metal layer 16a so as to form a transparent conductive layer 17a. Further, the metal layer 16b is formed on the front surface of the substrate 11b, and a solution containing constituents of the resin that forms the transparent electrode layer 12b is applied on the metal layer 16b so as to form a transparent conductive layer 17b. Then, the transparent electrode layers 12a, 12b are formed on one surface of the substrates 11a, 11b through the same processes as those shown in FIGS. 8 to 15. Then, the rear surface of the substrate 11a and the rear surface of the transparent electrode layer 12b are bonded via the adhesive layer 23 to form the transparent conductive laminate 20. Resins used for the adhesive layer 23 include acrylic resin, silicone resin and rubber resin. Resins having high cushioning properties and transparency are preferably used for the adhesive layer 23.

In the transparent conductive laminate 30 shown in FIG. 3, the metal layer 16a is formed on the front surface of the substrate 11b, and a solution containing constituents of the resin that forms the transparent electrode layer 12a is applied on the metal layer 16a so as to form a transparent conductive layer 17a. Further, the metal layer 16b is formed on the front surface of the substrate 11b, and a solution containing constituents of the resin that forms the transparent electrode layer 12b is applied on the metal layer 16b so as to form a transparent conductive layer 17b. Then, the rear surface of the substrate 11a and the rear surface of the substrate 11b are bonded via the adhesive layer 23. After that, the transparent conductive laminate 30 is formed through the same processes as those shown in FIGS. 8 to 15. Resins used for the adhesive layer 23 include acrylic resin, silicone resin and rubber resin. Resins having high cushioning properties and transparency are preferably used for the adhesive layer 23.

[Configuration of Touch Panels]

Figure 16:
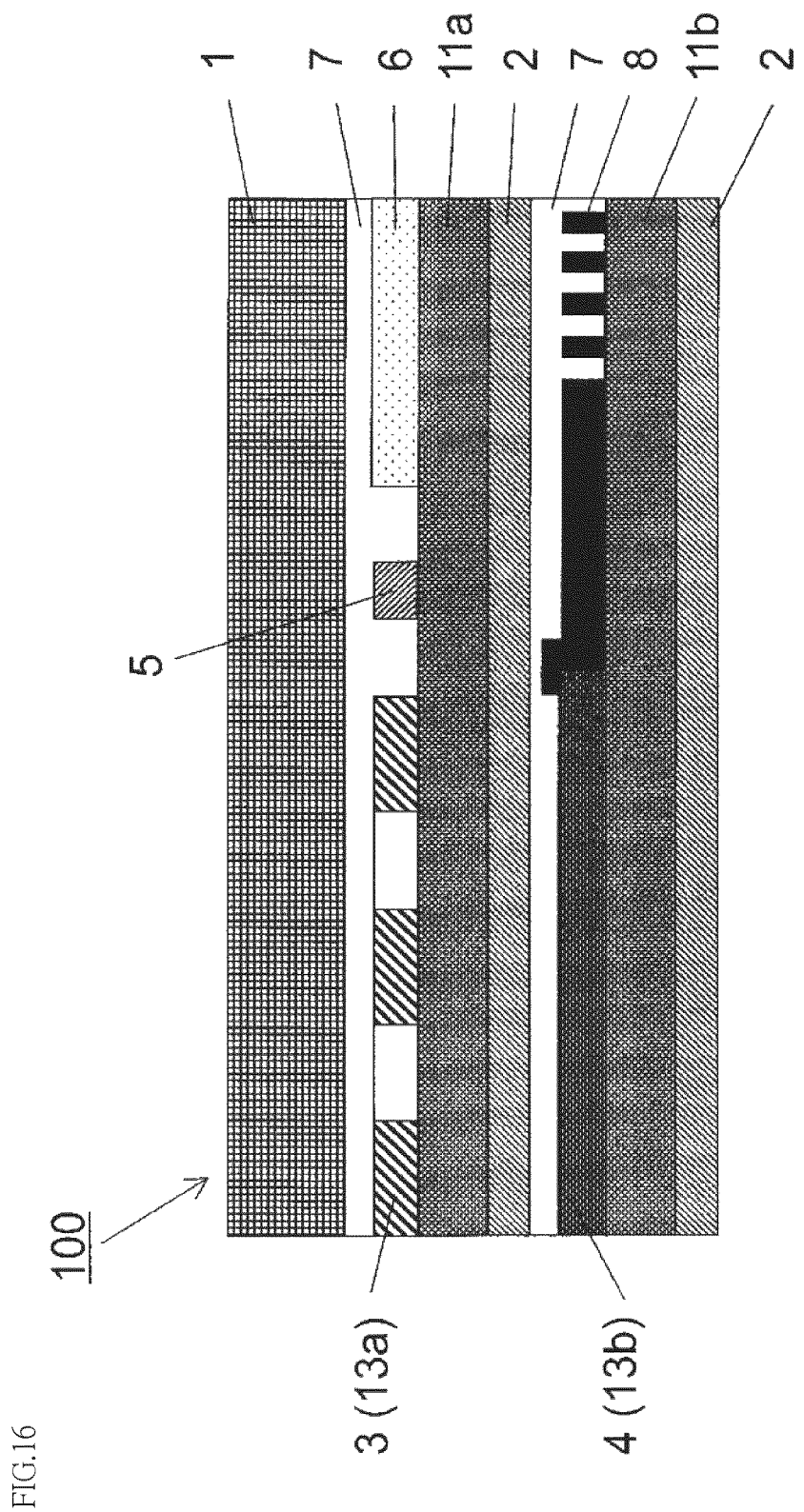
FIG. 16 is a cross sectional view of the touch panel according to an embodiment.
Figure 17:
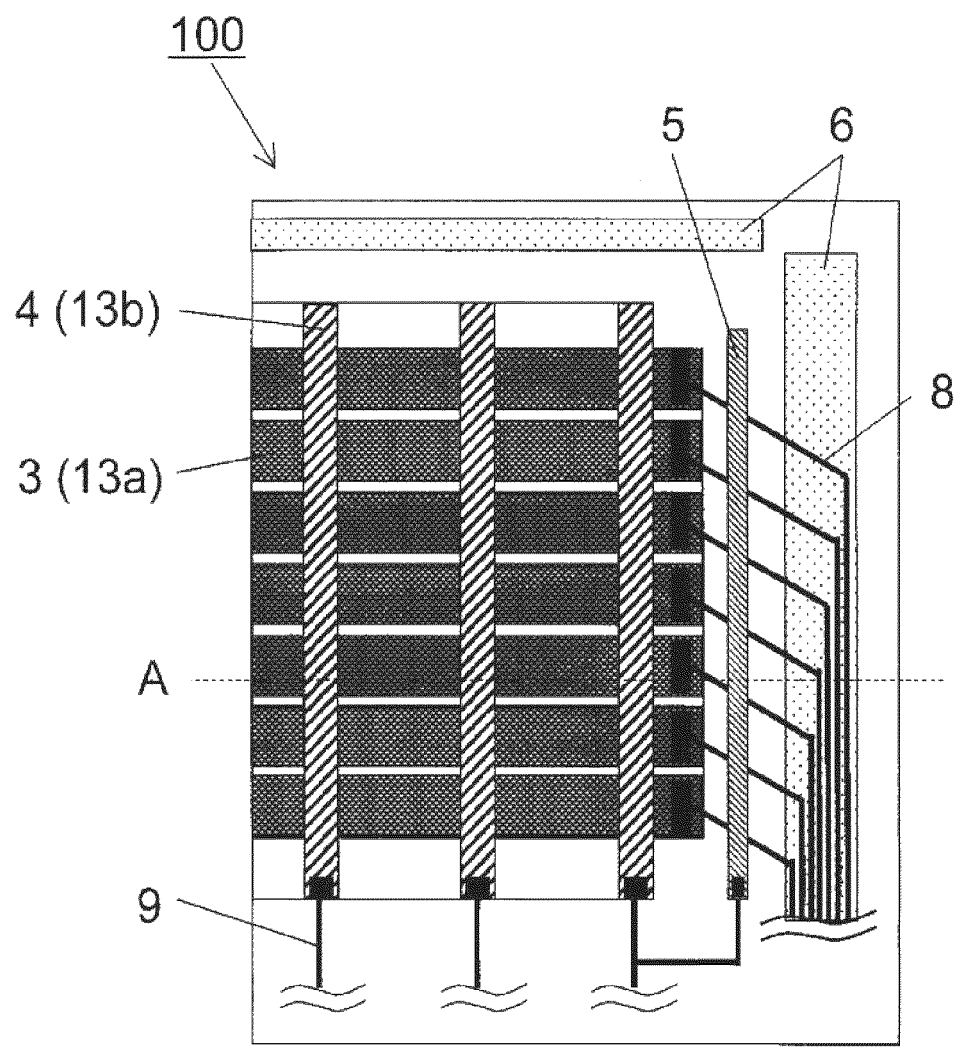
FIG. 17 is a plan view of the touch panel according to an embodiment.
Figure 18:
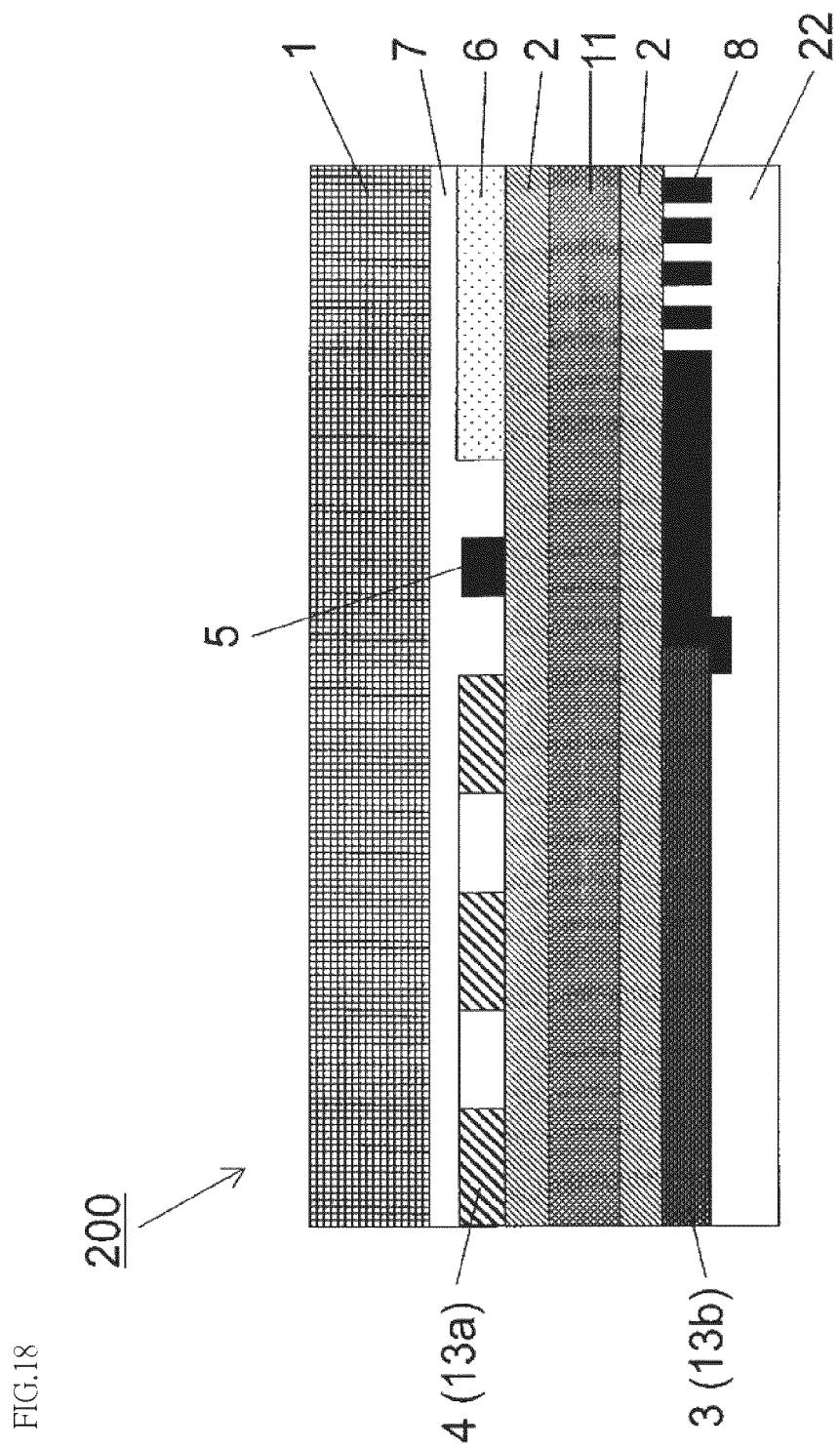
FIG. 18 is a cross sectional view of the touch panel according to an embodiment and an example.

FIGS. 16 and 18 show examples of cross section of the touch panels 100, 200 according to embodiments of the present invention. FIG. 16 is a cross sectional view taken along the line A of FIG. 17 which shows a plan view of the touch panel 100. FIG. 18 is a cross sectional view taken along the line B of FIG. 19 which shows a plan view of the touch panel 200 according to the present invention. FIGS. 16 to 19 are views which show part of the touch panel.

The touch panels 100, 200 include at least substrates 11, 11a, 11b, a plurality of drive electrodes 3 formed by the patterned conductive region 13a, a plurality of sense electrodes 4 formed by the patterned conductive region 13b, metal wirings 8, 9 connected to the conductive regions 13a, 13b, a transparent adhesive layer 7, and a sensor cover 1. The drive electrode 3 and the sense electrode 4 are disposed in different layers with the substrate 11 interposed therebetween and extend to intersect with each other. The drive electrodes 3 are each formed in a linear shape and are connected to the metal wirings 8 disposed in the same layer. The sense electrodes 4 are each formed in a linear shape and are connected to the metal wirings 9 disposed in the same layer.

In the touch panel 100 shown in FIG. 16, the drive electrodes 3 and the sense electrodes 4 are formed on the same side of different substrates 11 (upper side in FIG. 16).

In the touch panel 200 shown in FIG. 18, the drive electrodes 3 and the sense electrodes 4 are formed on different sides of the same substrate 11.

In the touch panels 100, 200, an area in which all the drive electrodes 3 are arranged is a first sensor area, while an area in which all the sense electrodes 4 are arranged is a second sensor area. Further, as seen in the thickness direction of the touch panels 100, 200, an overlapped area of the first sensor area and the second sensor area added with half of an arrangement pitch of the drive electrodes 3 or the sense electrodes 4 is a touch sensor effective area.

The touch panels 100, 200 further include a ground electrode 6 and an auxiliary electrode 5.

Figure 19:
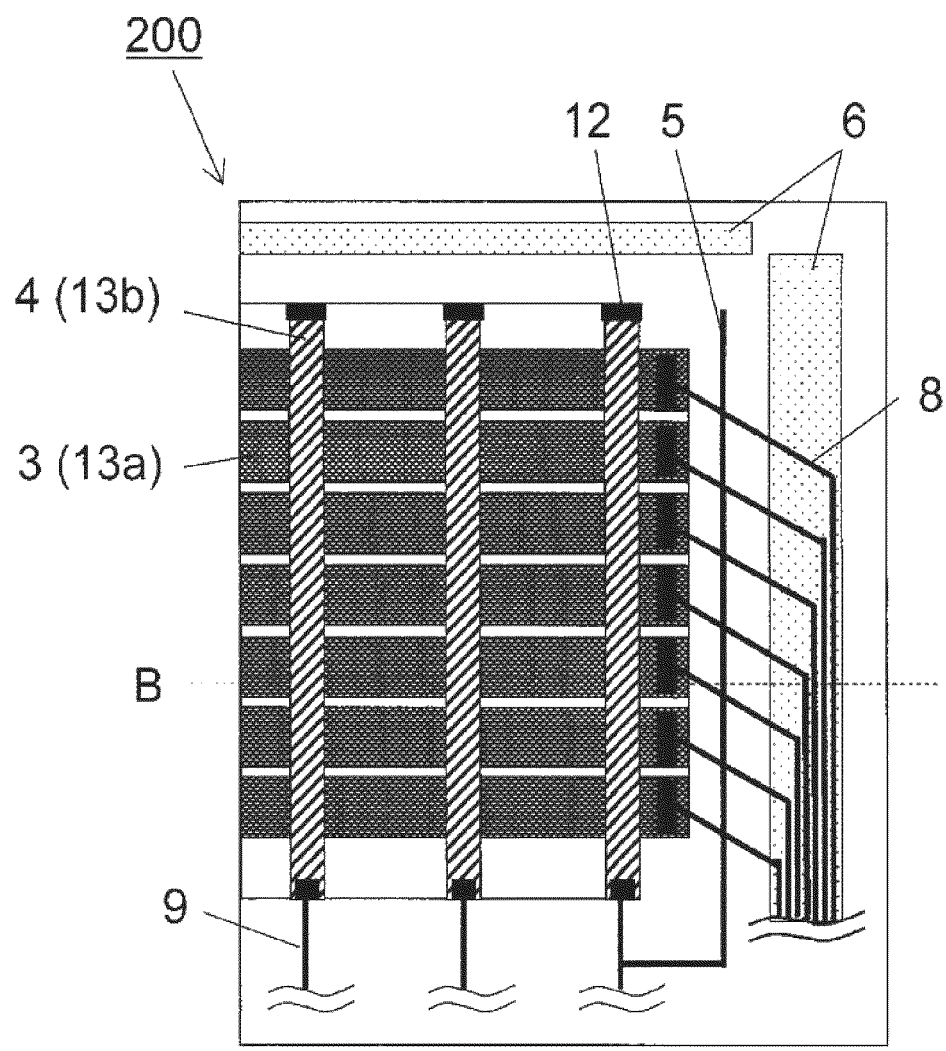
FIG. 19 is a plan view of the touch panel according to an embodiment and an example.

The ground electrode 6 includes a ground potential. The ground electrode 6 is disposed in the same layer as the electrodes of one of the drive electrodes 3 or the sense electrodes 4, and is disposed outside the sensor area in which one of the electrodes are provided. As shown in FIGS. 17 and 19, the ground electrode 6 is disposed on one side of the substrate 11 on the peripheral area.

The auxiliary electrode 5 is formed in a linear shape. The auxiliary electrode 5 is disposed between the ground electrode 6 and the electrode closest to the ground electrode 6 (the outermost conductive regions 13a, 13b) out of the drive electrodes 3 or the sense electrodes 4 disposed in the same layer as the ground electrode 6. The auxiliary electrode 5 is made of an electrically conductive material and is constantly at an equal potential to that of the drive electrode 3 or the sense electrode 4 closest to the above ground electrode 6. In the touch panels 100, 200, the auxiliary electrode 5 is disposed outside the sense electrodes 4 and is connected so as to be at equal potential at the time of selection and non-selection of the outermost sense electrode 4.

The auxiliary electrode 5 may be disposed outside the outermost conductive regions 13a, 13b which form the drive electrodes 3 or the sense electrodes 4 disposed in the layer different from that of the auxiliary electrode 5. Furthermore, the auxiliary electrode 5 is disposed outside the touch sensor effective area. The auxiliary electrode 5 is disposed outside the sensor area in which the drive electrode 3 or the sense electrode 4 disposed in the layer different from that of the auxiliary electrode 5 are arranged and extends to intersect with the metal wiring 8 or 9 connected to the drive electrode 3 or the sense electrode 4 disposed in the layer different from that of the auxiliary electrode 5. The drive electrode 3, the sense electrode 4 or the metal wirings 8, 9 disposed in the layer different from that of the auxiliary electrode 5 at a position overlapping the auxiliary electrode 5 may have a width (width of the conductive regions 13a, 13b disposed outside the touch sensor effective area) smaller than 500 μm. Further, the width of the auxiliary electrode 5 may be smaller than 1 mm. The auxiliary electrode 5 may contain at least a metal nanowire, and the metal nanowire may be covered with the resin layer. Further, the auxiliary electrode 5 may include a metal electrode. An end of the drive electrode 3 and/or the sense electrode 4 which is not connected to the metal wirings 8, 9 may be covered with the metal material.

As shown in the touch panel 200 of FIG. 18, when the drive electrodes 3 are formed on one side of one substrate 11 and the sense electrodes 4 are formed on the other surface, a protective layer 22 may be disposed on the surface of the substrate 11 opposite to the sensor cover 1. The protective layer 22 is provided to impart a mechanical strength or an environmental durability in order to protect the drive electrodes 3 or the sense electrodes 4 and the metal wiring 8 connected to the drive electrode 3 or the metal wiring 9 connected to the sense electrode 4. Resins used for the protective layer 22 are not specifically limited, but are preferably resins having transparency. Specifically, photo-curable resins such as monomers or cross-linking oligomers having a main component of tri- or higher functional acrylate which is expected to form a 3D cross-linked structure are preferable, and the same materials as those of the resin layer 2 may be used. A method for manufacturing the protective layer 22 may also be the same as that for the resin layer 2.

When used as a touch panel sensor, the conductive regions 13a, 13b that form the drive electrodes 3 and the sense electrodes 4 are formed in a pattern of rectangles, diamonds or the like. The conductive regions 13a, 13b are connected to the metal wiring 8 or 9, and connected to a voltage change detecting circuit that detects a change in voltage via the metal wiring 8 or 9. When a user's finger or the like approaches the sense electrode 4, which is a detection electrode, the total capacitance changes, and thus the voltage of the circuit changes. This allows for detection of the contact position. The patterns of the conductive regions 13a, 13b are made up of a series of the arrays of the drive electrodes 3 and the arrays of sense electrodes 4. The arrays of the drive electrodes 3 and the arrays of sense electrodes 4 are each electrically connected to the voltage change detecting circuit so that two dimensional positional information can be obtained.

The metal wirings 8 and 9, the auxiliary electrode 5, and the ground electrode 6 may be made of metal. Metals such as iron, cobalt, nickel, copper, zinc, molybdenum, aluminum, titanium, ruthenium, rhodium, palladium, silver, osmium, iridium, platinum and gold can be used. However, considering conductive properties, copper, silver, molybdenum, aluminum, titanium or a laminate thereof is preferably used.

As a method for forming and patterning the metal electrodes 5, 6 or the metal wiring 8, 9, dry methods such as physical vapor deposition method, for example, vacuum vapor deposition or sputtering, and chemical vapor deposition method, for example, a CVD method can be used. In addition to that, a method of applying or sintering nano particles may also be used. Patterning may be performed by etching, lift-off, screen printing that directly print the metal paste or metal ink, ink jet, gravure offset printing, relief printing, gravure printing, imprinting and the like. In any of those methods, conditions are appropriately selected according to processability such as heat resistance or chemical resistance of the substrate 11.

In the touch panels 100, 200, the auxiliary electrode 5 made of a conductive material is disposed between the conductive regions 13a, 13b that form the drive electrodes 3 or the sense electrodes 4 and the ground electrode 6 disposed in the same layer as the conductive regions 13a, 13b. Since the auxiliary electrode 5 is located outside the drive electrodes 3 or the sense electrodes 4, the auxiliary electrode 5 is disposed outside the touch sensor effective area. That is, in normal usage, the auxiliary electrode 5 is disposed under a frame of the sensor cover 1. The auxiliary electrode 5 is made of a transparent conductive material or a metal material, and is electrically short-circuited to the outermost electrode of the drive electrodes 3 or the sense electrodes 4 in the same layer on the sensor panel. The auxiliary electrode 5 is constantly at an equal potential to that of the outermost drive electrode 3 or the sense electrode 4. Wiring design that connects the metal wiring 9 and the auxiliary electrode 5 as shown in FIGS. 17 and 19 is preferably used, but is not limited thereto. It is also possible to connect the metal wiring 8 or 9 and the auxiliary electrode 5 which is desired to be at an equal potential to an LSI chip and transmit a signal from the LSI chip so as to allow for the equal potential.

In FIGS. 16 and 18, the ground electrode 6 and the auxiliary electrode 5 are formed in the same layer as the sense electrode 4. The auxiliary electrode 5 is disposed between the ground electrode 6 and the sense electrode 4 closest to the ground electrode 6 out of the plurality of sense electrodes 4. The auxiliary electrode 5 extends in the same direction as the electrodes 4, 6 and spaced from the electrodes 4, 6.

Furthermore, when the ground electrode 6 and the auxiliary electrode 5 are formed in the same layer as the drive electrode 3, the auxiliary electrode 5 is disposed between the ground electrode 6 and the drive electrode 3 closest to the ground electrode 6 out of the plurality of drive electrodes 3. The auxiliary electrode 5 extends in the same direction as the electrodes 3, 6 and spaced from the electrodes 3, 6.

In the touch panels 100, 200, since the auxiliary electrode 5 is constantly at an equal potential to the outermost drive electrode 3 or the sense electrode 4 on the sensor area, it is possible to suppress generation of an electric field in a specific direction between the ground electrode 6 and the drive electrodes 3 or the sense electrodes 4. As a result, occurrence of ion migration from the drive electrode 3 or the sense electrode 4 to the ground electrode 6 can be prevented. Thus, the touch panels 100, 200 with improved environmental durability can be provided. In particular, this is effective when silver or copper that is likely to undergo ion migration is used as a material for the conductive region 13a, 13b.

As shown in FIGS. 16 and 18, the auxiliary electrode 5 may be disposed to overlap the metal wiring 8 or 9 in the layer different from that of the auxiliary electrode 5, or may be disposed to overlap the drive electrode 3 or the sense electrode 4 in the layer different from that of the auxiliary electrode 5. However, since the auxiliary electrode 5 and the electrodes 3, 4 or the wirings 8, 9 in the different layer form a capacitance therebetween, the overlapping area should be small as possible to minimize the effect. Accordingly, the width of the auxiliary electrode 5 is preferably smaller than 1 mm, and the width of the metal wirings 8, 9, the drive electrode 3 or the sense electrode 4 which is disposed in the different layer from the auxiliary electrode 5 so as to overlap the auxiliary electrode 5 is preferably smaller than 500 μm.

An end covering electrode 12 that is covered with metal may be provided on an end of the drive electrode 3 and/or the sense electrode 4 which is not connected to the metal wirings 8, 9. In FIG. 19, an end of the sense electrode 4 which is not connected to the metal wiring 9 is covered with the end covering electrode 12. The end covering electrode 12 may be made of metal materials such as copper, silver, molybdenum, aluminum, titanium, or the laminate thereof. Further, transparent conductive materials such as ITO may also be used.

The drive electrode 3 and the sense electrode 4 serve as capacitance detection sensors. As shown in FIG. 18, the drive electrode 3 and the sense electrode 4 may be provided on both sides of one substrate 11. Alternatively, as shown in FIG. 16, the drive electrode 3 and the sense electrode 4 may be provided on separate substrates 11 and bonded to each other via the transparent adhesive layer 7 so as to be disposed in the up and down direction. Since the drive electrode 3 and the sense electrode 4 formed by the conductive regions 13a, 13b are connected to the metal wirings 8, 9, respectively, and connected to a circuit that detects a change in voltage between an upper electrode and a lower electrode of the conductive regions 13a, 13b, it operates as a capacitive touch sensor. The touch sensor can be finally bonded to a sensor cover 1 via the transparent adhesive layer 7 to form the touch panel. The sensor cover 1 may be a glass, or a sheet of resin or plastic material with the surface processed with a hard coat treatment. If a glass is used, the glass is preferably a reinforcement glass which is chemically reinforced by ion exchange of sodium ions in the soda-glass.

In the touch panels 100, 200, the conductive regions 13a, 13b are insulated from each other. The conductive regions are preferably in such a state that the adjacent two conductive regions are insulated from each other for a period of at least 240 hours when a voltage is applied to the adjacent two conductive regions under the atmosphere of high temperature and high humidity (for example, temperature of 60° C., humidity of 90% RH). Further, the resistance value in the insulated state is preferably $10^9$ Ω or more.

EXAMPLE

Examples of the present invention will be described below. However, the technical scope of the present invention is not limited to those examples.

Example 1

A UV curable resin was applied on one surface of a PET substrate (75 μm), and a metal layer made up of fibrous metals was formed on the PET substrate by die coating. Then, a solution containing acryl monomers as a main component was applied by micro gravure coating so as to form a film with a dry film thickness of 70 nm. After curing by UV radiation, a transparent conductive layer was obtained. A metal layer and a transparent conductive layer were also formed on the other surface of the PET substrate in the same manner. Then, a negative resist was applied by a photolithography process, and was then cured by UV radiation. After that, etching by hydrochloric acid (0.1%), resist stripping by sodium hydroxide solution (1%), and patterning were performed to form a plurality of strip-shaped conductive regions. Conductive paste containing epoxy resin and silver as a base was used to form a routed wiring on the strip-shaped conductive regions by screen printing. Accordingly, a transparent conductive laminate having a transparent electrode layer with a film thickness of 70 nm was obtained. The adjacent conductive regions of the obtained transparent conductive laminate were supplied with a voltage of 5V and left under the environment of temperature 60° C. and humidity of 90%. A resistance per hour was measured by using an interwire insulation evaluation device. Measurement was conducted for 500 hours. Further, two transparent conductive laminates were bonded to each other via an adhesive layer. Then, a cover member made of glass was bonded by using an adhesive, and an IC control circuit was connected to form a touch panel. An operation test was conducted under the environment of temperature of 60° C. and humidity of 90% on a continuous basis to confirm a touch position and a detection position per hour.

Comparative Example 1

A UV curable resin was applied on one surface of a PET substrate (75 μm), and a metal layer made up of fibrous metals was formed on the PET substrate by die coating. Then, a solution containing acryl monomers as a main component was applied by micro gravure coating so as to form a film with a dry film thickness of 300 nm. After curing by UV radiation, a transparent conductive layer was obtained. Similarly, a metal layer and a transparent conductive layer were also formed on the other surface of the PET substrate in the same manner. Then, a negative resist was applied by a photolithography process, which was then cured by UV radiation. After that, etching by hydrochloric acid (0.1%), resist stripping by sodium hydroxide solution (1%), and patterning were performed. Conductive paste containing epoxy resin and silver as a base was used to form a routed wiring by screen printing. Accordingly, a transparent conductive laminate having a transparent electrode layer with a film thickness of 300 nm was obtained. The adjacent conductive regions of the obtained transparent conductive laminate were supplied with a voltage of 5V and left under the environment of temperature 60° C. and humidity of 90%, and a resistance per hour was measured. Measurement was conducted for 500 hours. Further, two transparent conductive laminates were bonded to each other via an adhesive layer. Then, a cover member made of glass was bonded by using an adhesive, and an IC control circuit was connected to form a touch panel. An operation test was conducted under the environment of temperature of 60° C. and humidity of 90% on a continuous basis to confirm a touch position and a detection position per hour.

Table 1 shows measurement results in Example 1 and Comparative example 1.

In Example 1, the adjacent conductive regions remained insulated with a resistance of $10^9$ Ω or more after 240 hours elapsed under the environment of temperature of 60° C. and humidity of 90%. Furthermore, insulation was maintained after 500 hours elapsed without decrease of the resistance. On the other hand, in Comparative example 1, a resistance between the adjacent conductive regions gradually decreased under the environment of temperature of 60° C. and humidity of 90%, and reached $5.0 \times 10^4$ Ω after 150 hours elapsed. The resistance further decreased as the time elapsed. When the substrate of Comparative example 1 was observed by an optical microscope, a metal dendrite was present on the non-conductive region. A touch panel was manufactured by using the transparent conductive laminate of Example 1 and Comparative example 1. The touch was properly recognized in Example 1, while a wrong position was detected to be touched, that is, an erroneous touch recognition occurred in Comparative example 1. From the results described above, it was confirmed that the transparent conductive laminate according to Example 1 did not show an erroneous operation after it was left under high temperature and high humidity for a long period of time.

TABLE 1

| | Thickness of transparent electrode layer | Insulation resistance when 5 V was applied under the environment of temperature of 60° C. and humidity of 90% | | Touch panel operation test under the environment of temperature of 60° C. and humidity of 90% |
|---|---|---|---|---|
| | | Initial time | After 240 hours | After 240 hours |
| Example 1 | 70 nm | $1.5 \times 10^9 \, \Omega$ | $1.4 \times 10^9 \, \Omega$ | Erroneous recognition of the touch did not occur. |
| Comparative Example 1 | 300 nm | $1.4 \times 10^9 \, \Omega$ | $5.0 \times 10^4 \, \Omega$ [*1] | Erroneous recognition of the touch occurred. |

[*1] The value after 150 hours

Example 2

The touch panel 200 having the same layer configuration as that of FIG. 18 was fabricated. FIG. 19 is a plan view of an electrode section of the touch panel 200, and FIG. 18 is a schematic cross sectional view taken along the line B. A PET (125 μm) was used for the substrate 11, and a UV-curable transparent acryl resin with a UV absorber of 20 wt % added was applied on both surfaces of the substrate 11 by micro gravure coating, dried and UV-cured so as to form the resin layer 2 having a thickness of 5 μm on both surfaces of the substrate 11. A silver nanowire was applied as a material for the transparent electrode layers 12a, 12b by slot die coating on both surfaces of the obtained base material at a sheet resistance of 100 Ω/sq. to form the transparent electrode layers 12a, 12b. Similarly, a UV-curable transparent acryl resin was applied as the cured film at a thickness of 130 nm.

The base material having the transparent electrode layers 12a, 12b on both surfaces was exposed to light and developed by photolithography using a dry film photoresist, and then etched and stripped. Accordingly, the conductive region 13a on one surface was patterned as the drive electrode 3 and the conductive region 13b on the other surface was patterned as the sense electrode 4. In photolithography, development of the photoresist was performed by using a sodium carbonate solution, the silver nanowire was etched by using a ferric chloride solution, and the resist was stripped by sodium hydroxide solution. Further, a silver paste pattern was formed by screen printing and heated at 90° C. for 30 minutes to form the metal wirings 8, 9 on both surfaces of the base material. Here, the auxiliary electrode 5 was formed by a silver paste in the same layer as the sense electrode 4 as shown in FIG. 19. The width of the auxiliary electrode 5 was 100 μm. Further, the ground electrode 6 was also formed in the same layer as the sense electrode 4. The end covering electrode 12 was formed so as to cover an end of the sense electrode 4 as shown in FIG. 19.

The transparent adhesive layer 7 of 75 μm thick was disposed on the base material having the above-mentioned transparent conductive laminate, and then the chemically reinforced sensor cover 1 of 0.55 mm thick was bonded on the topmost surface to obtain the touch panel 200.

An operation test of the touch panel 200 was performed by connecting the metal wirings 8, 9 to a drive LSI via a flexible printed board. As a result, a finger touch and a coordinate position were successfully detected. The obtained touch panel was operated for 240 hours in the environment of temperature of 60° C. and humidity of 90%, and then removed from an environment test device. As a result of an operation test performed similarly to the above, a finger touch and a coordinate position were also successfully detected.

Comparative Example 2

Figure 20:
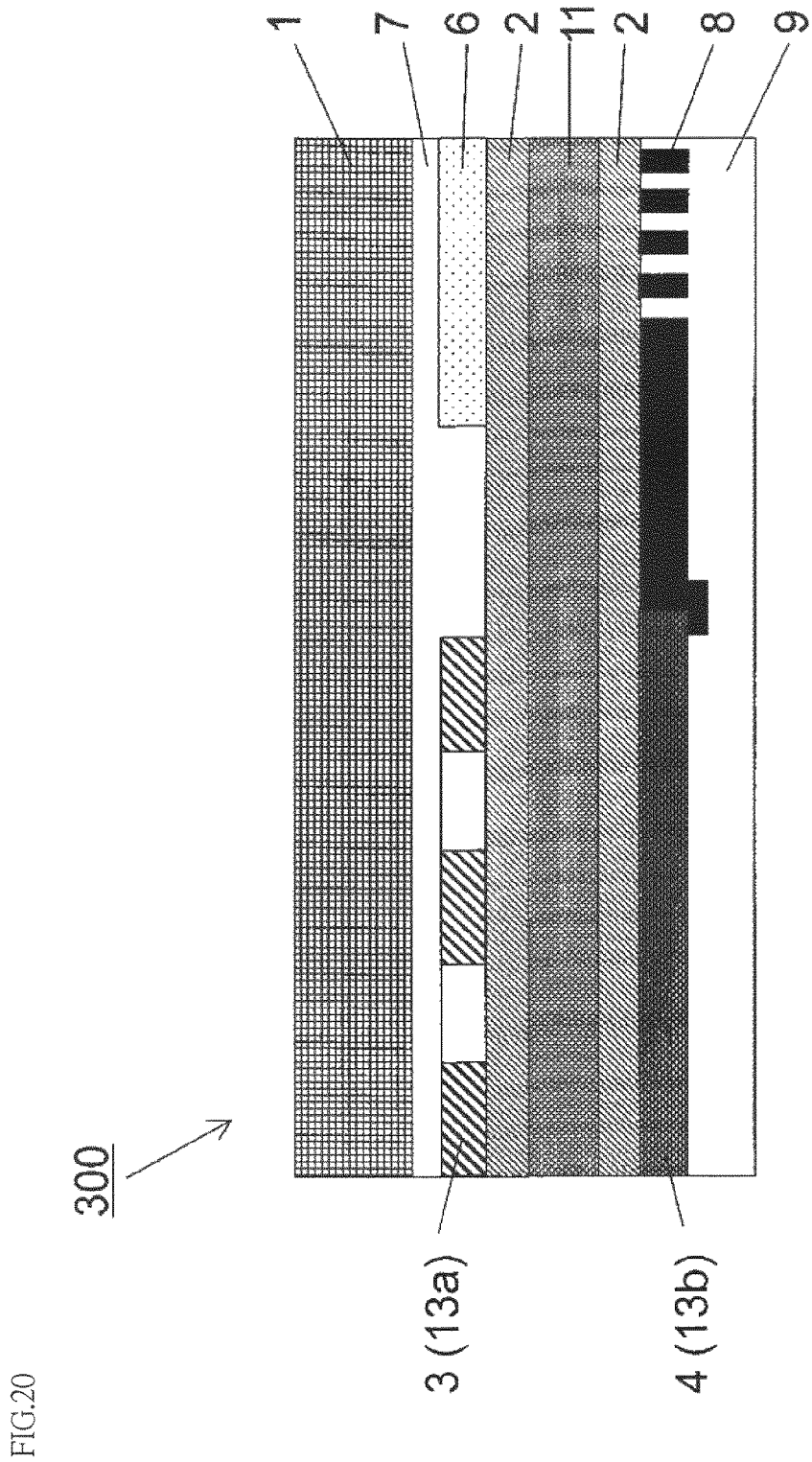
FIG. 20 is a plan view of the touch panel according to a comparative example.
Figure 21:
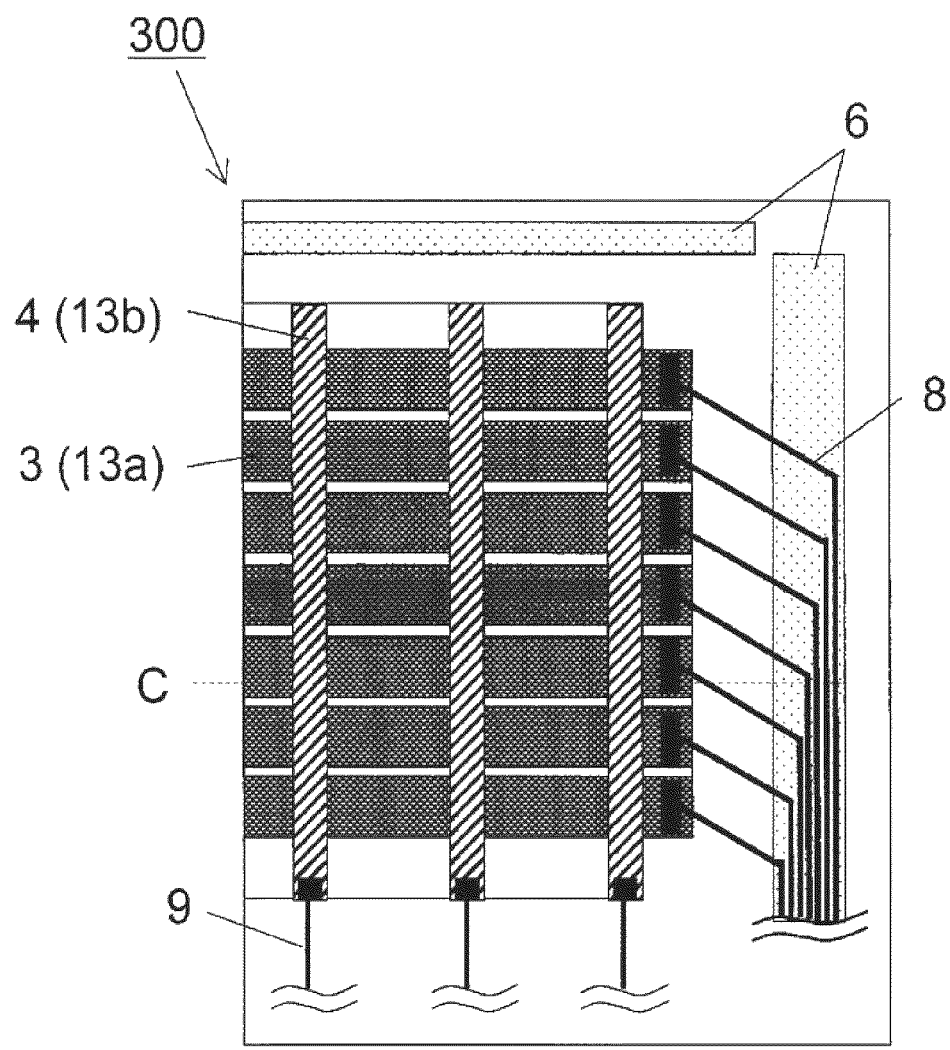
FIG. 21 is a plan view of the touch panel according to a comparative example.

The touch panel 300 having the same layer configuration as that of FIG. 20 was fabricated. FIG. 21 is a plan view of an electrode section of the touch panel 300, and FIG. 20 is a schematic cross sectional view taken along the line C.

The touch panel 300 was the same as Example 2 except that the auxiliary electrode 5 was not provided in the same layer as the sense electrode 4.

The operation of the touch panel 300 was good immediately after fabrication, and a finger touch and a coordinate position were successfully detected. After the obtained touch panel 300 was operated for 240 hours in the environment of temperature of 60° C. and humidity of 90%, and then removed from an environment test device. As a result of an operation test performed similarly to the above, touch detection properties on the peripheral area of the touch sensor were significantly deteriorated. Ion migration occurred in the silver nanowire of the conductive region 13b which forms the sense electrode 4 between the sense electrode 4 and the ground electrode 6.

From the above evaluation results, it was confirmed that a touch panel with high reliability can be provided by providing the auxiliary electrode 5 to suppress ion migration between the drive electrode 3 or the sense electrode 4 and the ground electrode 6.

INDUSTRIAL APPLICABILITY

The transparent conductive laminate and the touch panel having the transparent conductive laminate according to the present invention are used as a capacitive touch panel, and can be applied to user interfaces disposed on the front surface of smartphones, tablets, notebook computers and the like.

REFERENCE SIGNS LIST 1 sensor cover
2 resin layer
3 drive electrode
4 sense electrode
5 auxiliary electrode
6 ground electrode
7 transparent adhesive layer
8 metal wiring (drive electrode)
9 metal wiring (sense electrode)
10, 20, 30 transparent conductive laminate
11, 11a, 11b substrate (transparent base material)
12a, 12b transparent electrode layer
13a, 13b conductive region
14a, 14b non-conductive region
16a, 16b metal layer 17a, 17b transparent conductive layer
18a, 18b resist
19a, 19b mask
20a, 20b optical filter
21a, 21b light source
22 protective layer
23 adhesive layer
40a, 40b wiring
41 adhesive layer
50 cover layer
51 touch panel
52 display panel
53 display device
54 voltage applying device

What is claimed is:

1. A touch panel comprising:
a transparent conductive laminate comprising:
a transparent base material; and
a transparent electrode layer which contains a resin and is disposed on one or both sides of the transparent base material, wherein
the transparent electrode layer includes a plurality of conductive regions which contain fibrous metals, and a non-conductive region, and
the transparent electrode layer has a thickness of 30 nm or more and 150 nm or less;
a metal wiring connected to the conductive region;
a drive electrode and a sense electrode made up of the respective conductive regions and disposed in layers different from each other;
a ground electrode disposed in the same layer as either the drive electrode or the sense electrode outside a sensor area in which the either the drive electrode or the sense electrode is disposed; and
an auxiliary electrode disposed between the ground electrode and an electrode closest to the ground electrode out of the drive electrode or the sense electrode disposed in the same layer as the ground electrode, the auxiliary electrode being made of an electrically conductive material and being constantly at an equal potential to the electrode closest to the ground electrode;
wherein an electrical resistance between the conductive regions with the non-conductive region interposed therebetween is $10^9$ Ω or more after elapse of 240 hours under an atmosphere of temperature of 60° C. and humidity of 90%.

2. The touch panel of claim 1, wherein the auxiliary electrode is disposed outside an outermost area of the conductive region which forms the drive electrode or the sense electrode disposed in a layer different from the auxiliary electrode.

3. The touch panel of claim 1, wherein the auxiliary electrode is disposed outside a touch sensor effective area which is an area of an overlapped area of the sensor area in the same layer as the auxiliary electrode and the sensor area in a layer different from the auxiliary electrode added with half of an arrangement pitch of the drive electrode or the sense electrode.

4. The touch panel of claim 1, wherein the auxiliary electrode is disposed outside a sensor area in which the drive electrode or the sense electrode in a layer different from the auxiliary electrode and extends to intersect with the metal wiring connected to the drive electrode or the sense electrode in a layer different from the auxiliary electrode.

5. The touch panel of claim 1, wherein a width of the drive electrode, the sense electrode or the metal wiring disposed in a layer different from the auxiliary electrode at a position overlapping the auxiliary electrode is smaller than 500 μm.

6. The touch panel of claim 1, wherein a width of the auxiliary electrode is smaller than 1 mm.

7. The touch panel of claim 1, wherein the auxiliary electrode includes at least a metal nanowire.

8. The touch panel of claim 7, wherein the metal nanowire is covered with a resin layer.

9. The touch panel of claim 1, wherein the auxiliary electrode includes a metal electrode.

10. The touch panel of claim 1, wherein the drive electrode and/or the sense electrode has an end which is covered with a metal material, the end being not connected to the metal wiring.

* * * * *